US011205428B1

(12) United States Patent
Bao et al.

(10) Patent No.: US 11,205,428 B1
(45) Date of Patent: Dec. 21, 2021

(54) DELETING USER DATA USING KEYS

(71) Applicant: Amazon Technologies, Inc., Seattle, WA (US)

(72) Inventors: Yu Bao, Issaquah, WA (US); Matthew Orme, Renton, WA (US); Balaji Dhamodharaswamy, Seattle, WA (US); Trenton Dee Gillespie, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 265 days.

(21) Appl. No.: 16/585,692

(22) Filed: Sep. 27, 2019

(51) Int. Cl.
  *G10L 15/22* (2006.01)
  *G10L 15/30* (2013.01)
  *G10L 15/18* (2013.01)

(52) U.S. Cl.
  CPC .......... *G10L 15/22* (2013.01); *G10L 15/1815* (2013.01); *G10L 15/30* (2013.01); *G10L 2015/223* (2013.01)

(58) Field of Classification Search
  USPC ...................................................... 704/1–504
  See application file for complete search history.

(56) References Cited

U.S. PATENT DOCUMENTS

| | | | | |
|---|---|---|---|---|
| 10,163,436 B1 * | 12/2018 | Slifka | ..................... | G10L 13/00 |
| 10,332,517 B1 * | 6/2019 | Wang | .................. | G06F 21/6245 |
| 10,418,033 B1 * | 9/2019 | Mutagi | .................... | G10L 15/30 |
| 10,649,727 B1 * | 5/2020 | Douglas | .................. | G06F 3/167 |
| 2020/0342011 A1 * | 10/2020 | Miller | ..................... | G10L 15/26 |

* cited by examiner

*Primary Examiner* — Marcus T Riley
(74) *Attorney, Agent, or Firm* — Pierce Atwood LLP

(57) ABSTRACT

Described are techniques for tracking associations between known keys and internal keys related to user data received at a natural language processing system and shared with target systems. The system can receive a request to delete data associated with a user or device, and determine one or more known keys related to the request. The system can retrieve previously stored associations between known keys and internal keys, and use the associations to generate a delete command containing relevant internal keys to be sent to the target systems, which in turn can delete data associated with the internal keys.

20 Claims, 17 Drawing Sheets

| User Identifier | Utterance Identifier |
|---|---|
| user_ID_0001 | utterance_ID_0001 |
| user_ID_0001 | utterance_ID_0002 |
| user_ID_0001 | utterance_ID_0003 |
| user_ID_0002 | utterance_ID_0004 |
| user_ID_0002 | utterance_ID_0005 |
| user_ID_0001 | utterance_ID_0006 |

302

| User Identifier | Device Identifier | Utterance Identifier |
|---|---|---|
| user_ID_0001 | device_ID_0001 | utterance_ID_0001 |
| user_ID_0001 | device_ID_0002 | utterance_ID_0002 |
| user_ID_0001 | device_ID_0002 | utterance_ID_0003 |
| user_ID_0002 | device_ID_0001 | utterance_ID_0004 |
| user_ID_0002 | device_ID_0002 | utterance_ID_0005 |
| user_ID_0001 | device_ID_0002 | utterance_ID_0006 |

303

| User Identifier | Skill Identifier | Utterance Identifier |
|---|---|---|
| user_ID_0001 | skill_ID_0001 | utterance_ID_0001 |
| user_ID_0001 | skill_ID_0002 | utterance_ID_0002 |
| user_ID_0001 | skill_ID_0003 | utterance_ID_0003 |
| user_ID_0002 | skill_ID_0001 | utterance_ID_0004 |
| user_ID_0002 | skill_ID_0002 | utterance_ID_0005 |
| user_ID_0001 | skill_ID_0002 | utterance_ID_0006 |

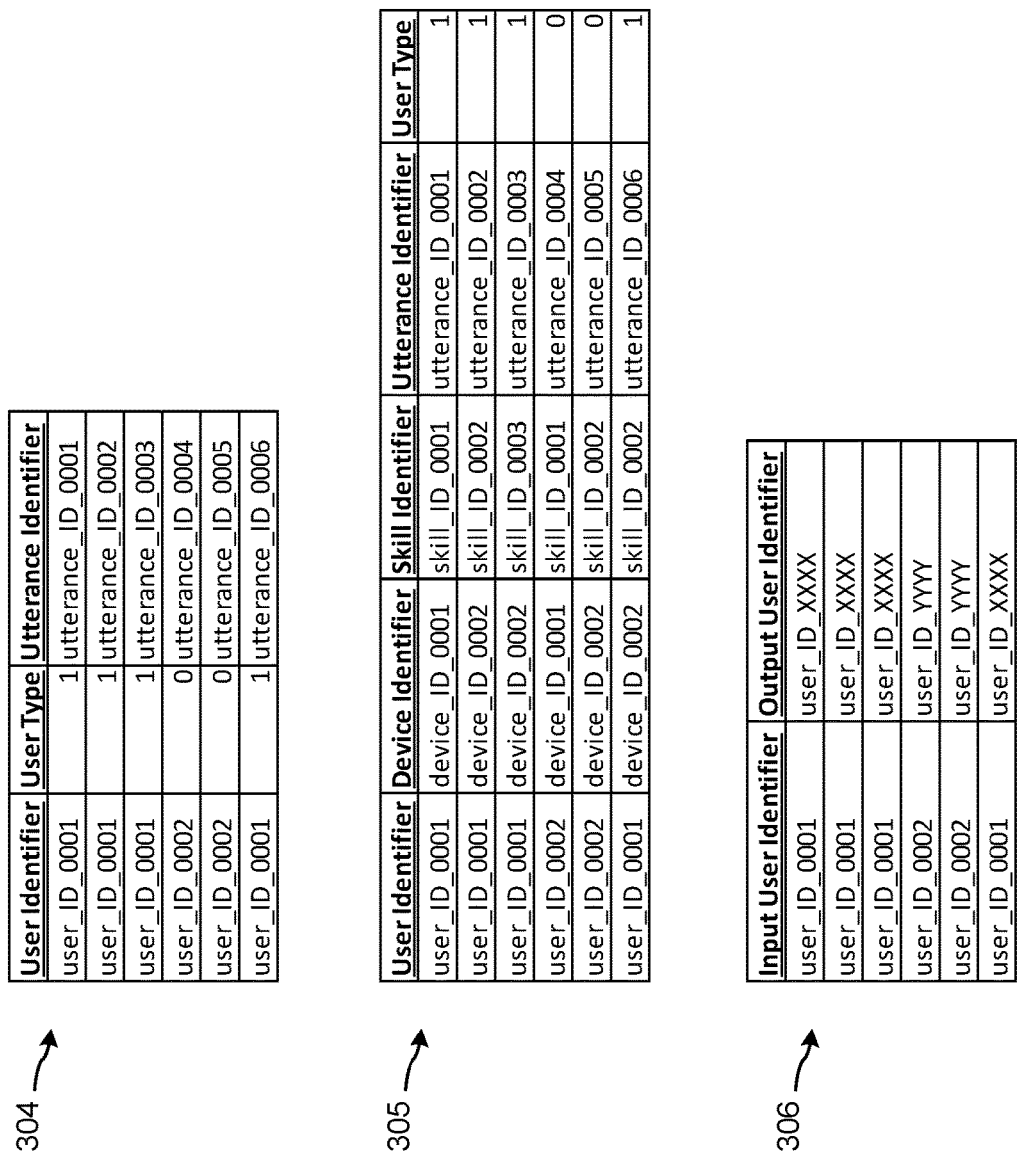

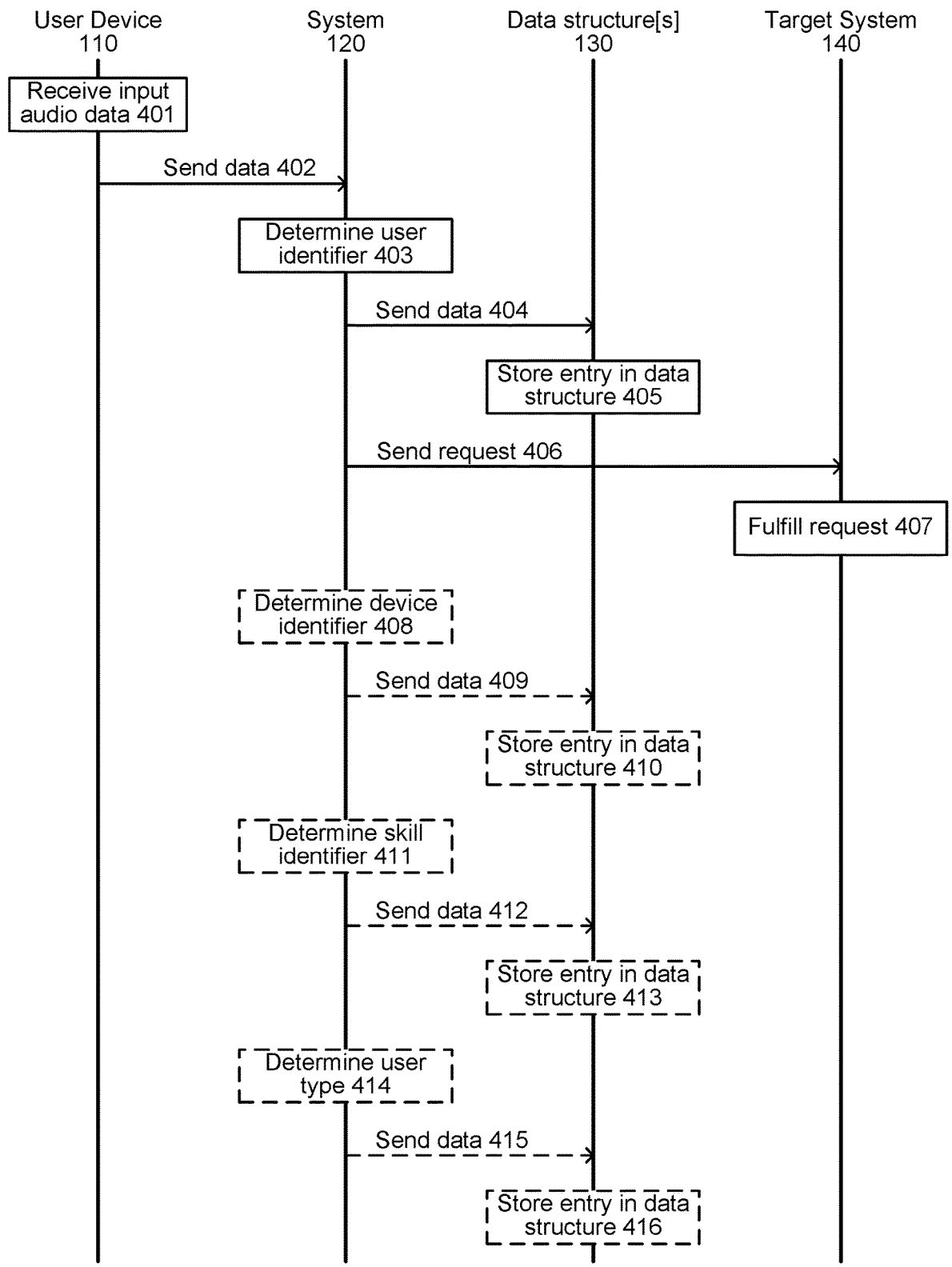

DELETING USER DATA USING KEYS

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 3A and FIG. 3B illustrate example data structures storing associations between known keys and keys, in accordance with embodiments of the present disclosure.

FIG. 4A through FIG. 4E illustrate example signal flow diagrams illustrating a manner in which data can be deleted using keys, in accordance with embodiments of the present disclosure.

DETAILED DESCRIPTION

Figure 1:
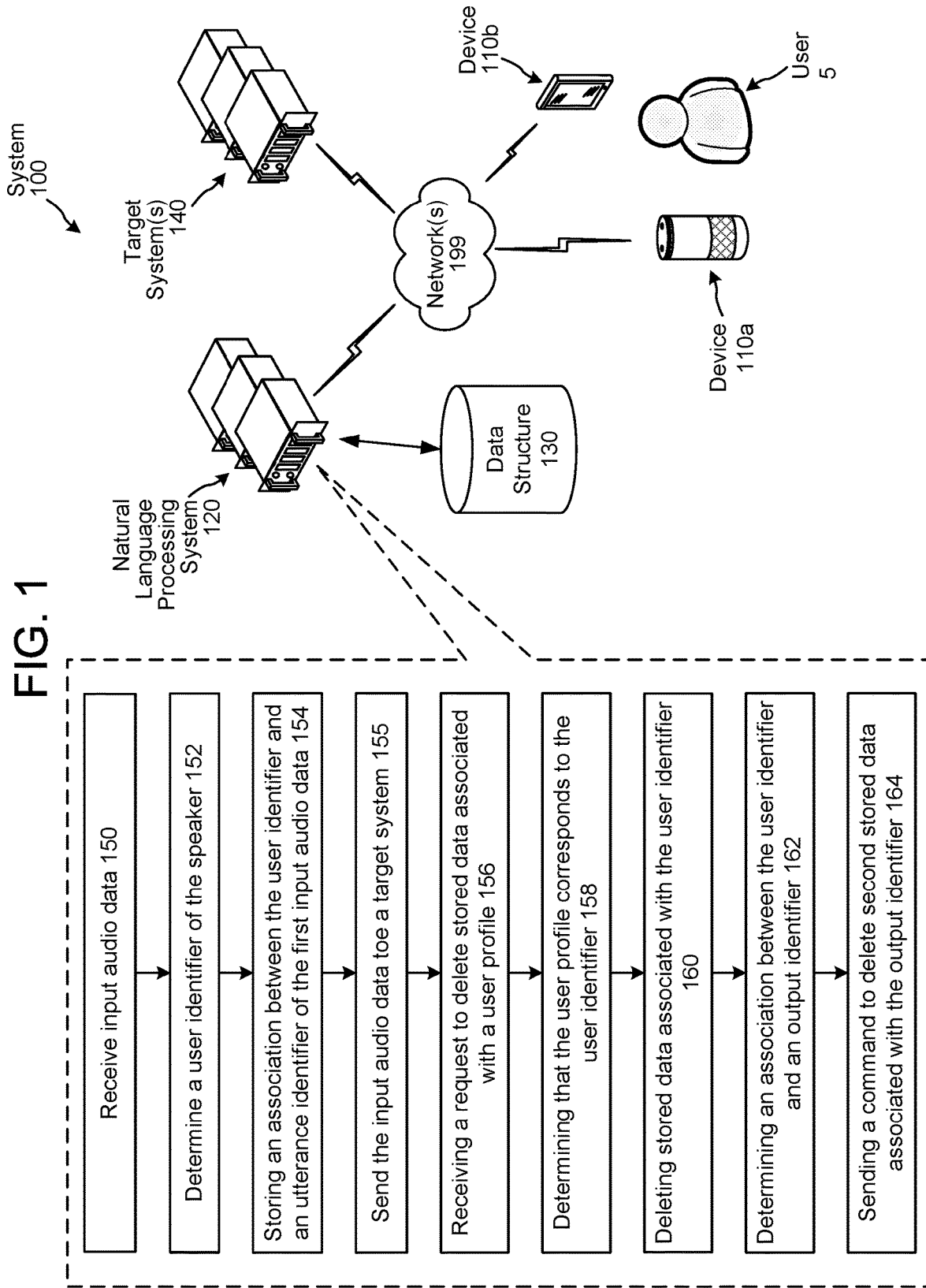
FIG. 1 illustrates a system for deleting user data using keys, in accordance with embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

A natural language processing system may be configured to perform actions in response to natural language user inputs. For example, for the user input of "play Adele music," a natural language processing system may output music sung by an artist named Adele. For further example, for the user input of "turn on the lights," a natural language processing system may turn on "smart" lights associated with the user's profile.

In an example operation, a user may use a natural language processing system by interacting with a network-connected smart device such as the Amazon Echo. The system may save, with permission from the user, information about the user's interaction with the system. Each piece of information can be assigned an identifier. Other systems may, again with permission from the user, also have access to user data, but may use different identifiers to track that data. If the user wishes to delete his or her data, the natural language processing system can delete the user data it has, and use the respective identifiers to tell the other systems to delete the user data they have.

A natural language processing system may receive user inputs in the form of input audio data and convert the input audio data into text data. The natural language processing system may store either or both of the input audio data and text data representing a transcription of the input audio data. Furthermore, the natural language processing system may share the data with other "target" systems, which may perform actions in response to the spoken-language commands or perform analysis on the audio and/or text data. For example, the natural language processing system may implement or communicate with one or more skills configured to perform actions responsive to natural language user inputs. As used herein, a skill may refer to software, hardware, and/or firmware running on a system, such as a target system, that enables the system to execute specific functionality in order to provide data or produce some other output in response to a natural language input. In at least some examples, a skill may be server-based or cloud-based. Example skills may include weather information skills, music playing skills, or the like. The functionality described herein as a skill may be referred to using many different terms, such as an action, bot, app, or the like. As used herein, a skill may refer to software, hardware, and/or firmware running on a system that enables the system to execute specific functionality in order to provide data or produce some other output in response to a natural language input.

A user may provide a natural language processing system with a type of data for the purpose of enabling the natural language processing system (and by extension one or more skills) to provide personalized responses to natural language user inputs of the user. For example, a user may provide a natural language processing system with health data to be used by a health care skill that can track and/or analyze the user's information to perform various tasks that the user may request. Thereafter, when the natural language processing system receives a natural language user input from that user, the natural language processing system may send the type of data (with the user's permission, for example as represented in a user profile corresponding to the user) to a skill to enable the skill to perform an action responsive to the natural language user input in view of the type of data. For further example, a user may provide a natural language processing system with a type of data along with a corresponding instruction to send the type of data to a skill for storage. In this example, the natural language processing system (with the user's permission) may or may not store a record of the type of data sent to the skill.

A user may wish to delete data previously provided by him or herself, or another user such as another user sharing an account. The requested deletion may be for privacy reasons, because the user wishes to end use of a particular skill or device (e.g., decommissioning a device) or for other reasons. In some cases, the software applications that previously received the user data now to be deleted may execute on computer systems separate and distinct from the system that originally received and/or processed the spoken words. In other cases, user data may (with user permission at the time) have been forwarded to other systems for analysis. Some jurisdictions have proposed or enacted regulations requiring natural language processing systems to delete recorded audio or text data of a user upon request. Each regulatory regime may differ in geographic scope, in the respective data sets that must be deleted upon request, and the amount of acceptable burden on the user. Depending on the particular regulation, the speech and text data may need to be deleted across all systems that received such data, but without undue burden on the user; e.g., the system should still perform as well for the user and other users linked to the user through an account or group association, if desired.

Accordingly, this disclosure offers a flexible system for tracking and deleting data to allow for surgical deletion that can be tailored to a user's request. The present system may allow deletion of data stored by the natural language processing system itself as well as any target systems that received the audio and/or text data (or other user data), and, in some cases, any data resulting from analyzing or otherwise processing the audio data, or text data, and/or other user data. The present system may generate a set of data for deletion of, for example, a particular user, skill, or device, without undue burden (such as loss of other skill or device functionality, or change in account status) on the requesting user or other users sharing the account.

The present disclosure describes various examples of data tracking that stores associations between input identifiers and output identifiers in one or more data structures. The input identifiers, sometimes referred to as "known keys," are identifiers that may be exposed to the user or otherwise stored or accessible by the user device and the natural language processing system. The output identifiers, sometimes referred to as "internal keys," may be used by the target systems, for example during an exchange with the natural language processing system and the target systems (for example, through an appropriate application programming interface (API)), but may not be exposed to the user or the user device, may not be easily trackable, and may not have clear relationships with the input identifiers that can be determined from looking at the output identifiers themselves. The present disclosure further describes a manner of generating delete commands based on the associations stored in the data structures, and sending (for example, broadcasting) the delete command from the natural language processing system to one or more target systems.

In an example operation, when the natural language processing system receives input audio data or user input in text or other form, the system can determine or assign one or more input identifiers to the input data. For example, the system can determine a user identifier of the speaker or a device identifier of the device receiving the input audio data. (For example, the system can associate an incoming with request with a user profile of a requesting device and/or identify the requesting user with user recognition techniques described herein.) The system can also determine or assign one or more output identifiers to the data. For example, the input audio data can be assigned an utterance identifier that can be unique to input data. The utterance identifier may additionally be used to label the text data and any other processed version of the input audio data or text data. Input audio data and corresponding text data representing a single discrete command or other type of input can either or both be referred to as an utterance. In addition, the natural language processing system can perform speech processing on the input audio data to determine a command represented by the input audio data, and further determine a skill corresponding to the command. The natural language processing system can then assign a skill identifier to the utterance. The natural language processing system can also determine a device identifier of the device receiving the input audio data. Input identifiers and output identifiers are not mutually exclusive, however. The device identifier, as well as other identifiers, can variously be used as both an input identifier and an output identifier depending on the operation. For each received utterance, the natural language processing system can store an association between one or more input identifiers and one or more output identifiers in one or more data structures in or associated with the system. When the system receives a request to delete data associated with a user, device, skill, etc., the system can retrieve the associations from the data structures, and use the associations to generate a delete command having output identifiers corresponding to the input identifiers and defining the set or sets of data to be deleted. The system can then send the delete command to one or more target systems that may have previously received the data to be deleted.

In at least some examples, the system can execute a request to delete stored data associated with a user device. This can be done, for example, to delete data associated with a child-directed device, or delete data associated with a device that a user wishes to deregister. The data to be deleted can include utterances received by the device as well as device history of aggregate data pertaining to the device and/or other data. The system can determine a plurality of output identifiers corresponding to the device identifier. The output identifiers can include the device identifier and any utterance identifiers associated with the device identifier in the data structures. In some cases, the user device may be a child-directed device; for example, a child's tablet or smart speaker.

In at least some examples, the system can execute a request to delete stored data associated with a skill. The system can perform speech processing on the input audio data to determine a command represented by the input audio data, and further determine a skill corresponding to the command. The system can then assign a skill identifier to the utterance. The system can determine a plurality of output identifiers corresponding to the user identifier and skill identifier. The output identifiers can include the skill identifier and any utterance identifiers associated with the user identifier and skill identifier in the data structures. In some cases, the skill may be a child-directed skill; for example, a children's app.

In at least some examples, the system can determine that the speaker of the input audio data is of a particular user type. For example the system can determine (using user profile data, user recognition data, or other data) that the speaker is a child (e.g., under 13), teenager (e.g., between 13-17), or adult (e.g., 18 years or older), is a family member, is a household guest, and/or other user type. The system can include a user type field in the association between the user identifier and the utterance identifier. The system can then include an indicator corresponding to the user type when generating the delete command.

In at least some examples, the system can receive acknowledgements of delete commands from target systems. The system can then store the acknowledgements for auditing purposes. The acknowledgement may vary depending on the status of the target system. For example, the acknowledgement may indicate that the target system deleted relevant data or that the target system found no relevant data in its memories. In some cases, the system can send two delete commands to target systems, where both delete commands indicate the same output identifier[s]. Based on the acknowledgments received from the target system, the system can infer the status of any relevant data stored by the target system. For example, if the first acknowledgement confirms deletion and the second acknowledgement indicates no relevant data was found, the system can infer that the target system successfully executed the delete command. If both acknowledgements confirm deletion, however, the system may infer that the target system has experienced an error causing it to either fail to process the delete command properly, to erroneously issue a delete confirmation, or both (presumably the system sent the delete commands in rapid enough succession that the target system should have received no new relevant data in the interim).

In at least some examples, the system can remove entries—e.g., data representing associations—from the data structure following deletion of the corresponding data. For example, once the system has issued a command to delete stored data associated with a device and utterances received at the device, there may no longer be a need to store those associations the data structures. Accordingly the system can delete the no-longer-relevant entries in order to conserve memory resources.

In at least some examples, a user can provide settings and other profile data to the system. For example, the user can provide location data for the purpose of getting weather forecasts, navigation directions, and local search results. The user may provide certain health or medical data for purposes of tracking health-related indicators such as exercise, diet, and weight. The user may provide device customization settings such as pre-programmed actions, wake words, and keywords. The user may provide personal information such as personal addresses, personal phone numbers, and contact information of other users and non-users of the system. Such settings may be provided via the natural language processing system or via manual input to a computing device. The system can allow the user to delete such settings and profile information as part of or separately from a request to delete data associated with input audio data. The system can, however, be configured to maintain this data when data associated with input audio data is deleted so as not to unduly burden a user who requests deletion of only a limited set of data, such as data related to a particular device or skill.

In at least some examples, a user may provide a natural language processing system and/or skill with permission to aggregate user and/or device data. Broadly speaking, aggregate data refers to statistics regarding a user's use of the natural language processing system 120, collections of data resulting from the use, and the results of any analysis thereof. In some cases, data may be aggregated for a particular user. Aggregate user data may include the results of statistical or voice analysis of a user. For example, the system may keep track of user habits such as shopping, listening to music, and searched terms for the purposes of providing a more tailored user experience. The system may note certain features of a user's voice and speech for the purposes of better understanding of the user's spoken language. In some cases, data may be aggregated for a particular device. Aggregate data for a device may include device state data such as history of use and statistical analysis regarding users, times of use, requested operations, settings, connected devices and networks, and status. In some cases, data may be aggregated among multiple users or devices. In some cases, aggregate data—e.g., from many users—may be sufficiently anonymized, rendering privacy concerns moot. In other cases, however, the system may not have the ability to sufficiently anonymize data aggregated for a particular device, such as a smart home device, to negate privacy concerns; that is, such aggregate data may easily be linked back to the user who owns or is otherwise associated with that device. Therefore, with respect to a user request to delete data, aggregate data may be handled differently depending on whether it has been aggregated with respect to a single user, multiple users, a single device, multiple devices, etc.

FIG. 1 shows a system 100 for deleting user data using keys. Although the figures and discussion illustrate certain operational steps of the system 100 in a particular order, the steps described may be performed in a different order (as well as certain steps removed or added) without departing from the intent of the disclosure. As shown in FIG. 1, the system 100 may include one or more devices 110 local to a user 5, a natural language processing system 120 having or associated with one or more data structures 130, and in communication with one or more target systems 140 connected across one or more networks 199.

The device 110*a* may receive audio corresponding to a spoken natural language user input originating from the user 5. The device 110*a* may generate audio data corresponding to the audio and may send the audio data to the natural language processing system 120. Alternatively, the device 110*b* may receive a text-based natural language user input from the user 5. The device 110*b* may generate text data corresponding to the text and may send the text data to the natural language processing system 120.

The device 110 may send the audio data and/or text data to the natural language processing system 120 via a companion application installed on the device 110. A companion application may enable the device 110 to communicate with the natural language processing system 120 via the network(s) 199. An example companion application is the Amazon Alexa application that may be installed on a smart phone, tablet, or the like.

The natural language processing system 120 may receive (150) first input audio data (e.g., audio data or text data) representing the natural language user input. The natural language processing system 120 may determine (152) a user identifier of the speaker of the input audio data. For example, the system may identify a voice of the user using speaker identification techniques such as those discussed below in reference to FIGS. 5-8. In some implementations, the system

120 may assign the first input audio data to the user profile or group profile associated with the user. The natural language processing system 120 may store (154) an association between the user identifier and an utterance identifier of the first input audio data in one or more data structures 130 stored in a memory of the natural language processing system 120. These steps may be repeated as further inputs are spoken by a user and the natural language processing system 120 stores associations between input identifiers (e.g., the user identifier) and output identifiers (e.g., utterance identifiers). The natural language processing system 120 may perform additional processing on the input audio data. For example, the natural language processing system 120 may determine a device identifier corresponding to a device that received the input audio data, determine that the speaker is a child, or perform speech processing using the first input audio data to determine a command represented by the first input audio data. The natural language processing system 120 may include in the stored associations other output identifiers such as the device identifier, a device account identifier, a customer identifier, an entity identifier, a skill identifier of a skill that corresponds to the command, or a user type. FIGS. 3A and 3B show example data structures 130 storing associations. The natural language processing system 120 may store some or all of the input audio data or text data determined from the input audio data. The natural language processing system 120 may further send (155) some or all of the data to one or more target systems 140. The target system 140 may include skill systems configured to execute request embodied by the data, or other systems configured to process or otherwise analyze the data.

The natural language processing system 120 may receive (156) a request to delete stored data associated with a user profile. The requestor (who may be the same or different from the user or users who previously provided input audio data to the natural language processing system 120) may make the request. The requestor can make the request by any one of a variety of means, including by speech input, manual entry via a web portal or device app, or via a phone call or Internet chat with a customer service representative. Under limited circumstances, an administrator of the natural language processing system 120 may internally initiate the deletion request.

To execute the deletion request, the natural language processing system 120 may determine (158) that the user profile corresponds to the user identifier. For example, a user may ask a system "Alexa, delete all my data." The system may perform natural language understanding (NLU) operations on the text corresponding to the utterance to determine that "my" refers to the requesting user and may determine the user's identifier for example by matching it with a user profile corresponding to the device the user is using, through user identification/speaker identification techniques such as those described in reference to FIGS. 5-8 below, or other techniques. The natural language processing system 120 may delete (160) any stored data associated with the user identifier. This can generally include deleting any data corresponding to the user identifier that the system as stored locally or in storage means under the control of the system. The natural language processing system 120 may determine (162) an association between the user identifier and a first output identifier. The natural language processing system 120 may send (164) a command to delete second stored data associated with the first output identifier.

In some implementations, the natural language processing system 120 may receive an acknowledgement of the delete command from the target system 140. The natural language processing system 120 can store the acknowledgement in a memory for auditing purposes; for example, to show compliance with a user deletion request and/or an applicable regulation. The acknowledgement returned by the target system 140 may vary depending on the status of the target system's 140 execution of the delete command. For example, the target system's 140 acknowledgement may indicate that the relevant data has been deleted, or that the target system found no such data in its memories. In some implementations, the natural language processing system 120 can send two delete commands to the target system 140, where both delete commands indicate the same output identifier[s]. The natural language processing system 120 can send the two delete commands in rapid enough succession that the target system should have received no new relevant data in the interim. The natural language processing system 120 can infer, based on the acknowledgments received from the target system 140, the status of any relevant data stored by the target system 140. For example, if the first acknowledgement confirms deletion and the second acknowledgement indicates no relevant data was found, the natural language processing system 120 can infer that the target system 140 executed the delete command properly. If both acknowledgements confirm deletion, however, the natural language processing system 120 may infer that the target system 140 has experienced an error causing it to either fail to process the delete command properly, to erroneously issue a delete confirmation, or both. These and other operations of the natural language processing system 120 are further illustrated in FIG. 4A through 4E and described further below.

Further details of the system 100 configured to track and delete types of data of users are explained below, following a discussion of the overall system 100 of FIG. 2A. The various components may be located on same or different physical devices. Communication between various components may occur directly or across a network(s) 199.

Figure 2A:
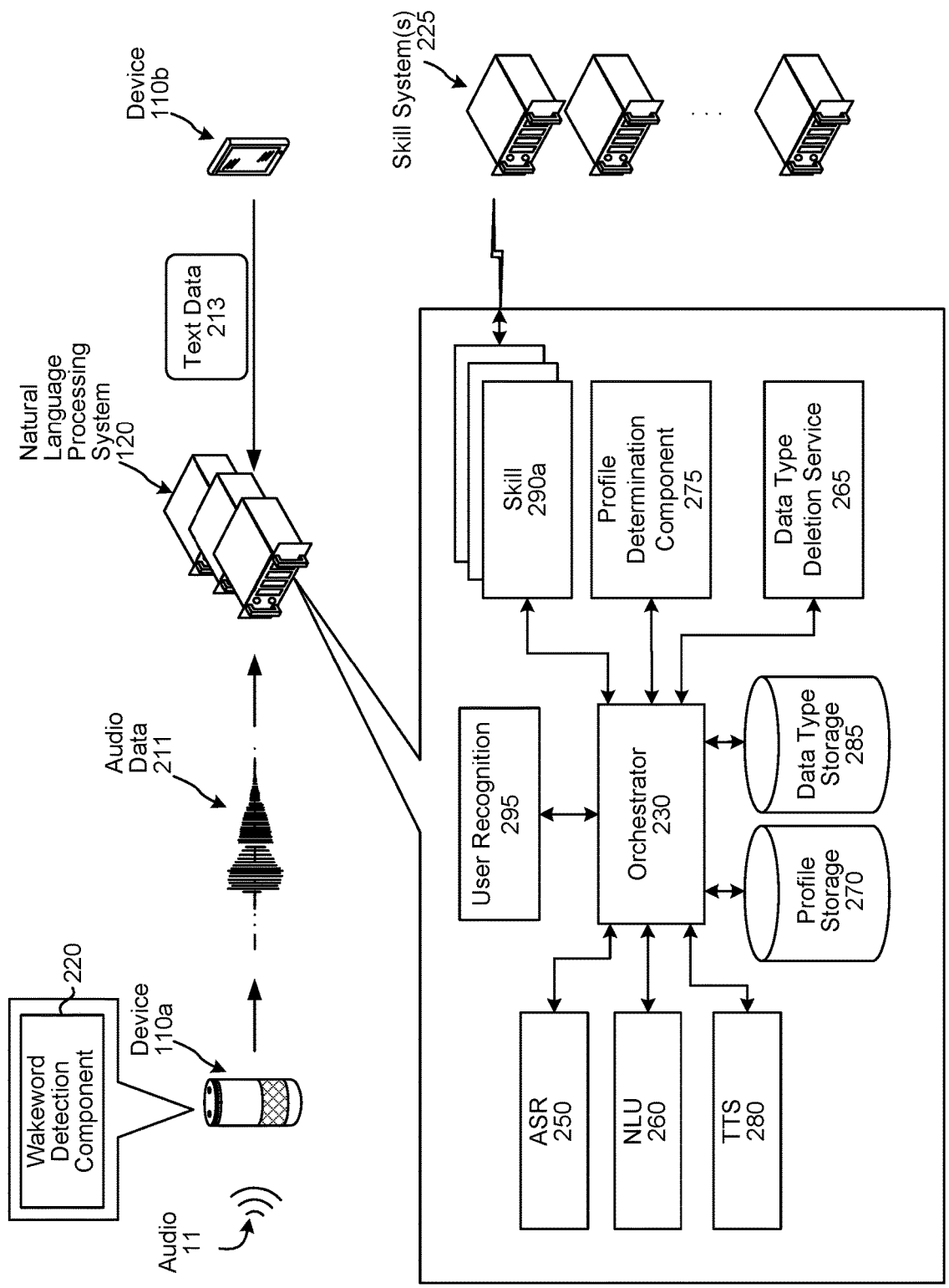
FIG. 2A is a conceptual diagram of components of a system, in accordance with embodiments of the present disclosure.

As shown in FIG. 2A, an audio capture component(s), such as a microphone or array of microphones of the device 110*a*, captures audio 11. The device 110*a* processes audio data, representing the audio 11, to determine whether speech is detected. The device 110*a* may use various techniques to determine whether audio data includes speech. In some examples, the device 110*a* may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110*a* may implement a limited classifier configured to distinguish speech from background noise. The classifier may be implemented by techniques such as linear classifiers, support vector machines, and decision trees. In still other examples, the device 110*a* may apply Hidden Markov Model (HMM) or Gaussian Mixture Model (GMM) techniques to compare the audio data to one or more acoustic models in storage. Such acoustic models may include models corresponding to speech, noise (e.g., environmental noise or background noise), or silence. Still other techniques may be used to determine whether speech is present in audio data.

Once speech is detected in audio data representing the audio 11, the device 110*a* may use a wakeword detection component 220 to perform wakeword detection to determine when a user intends to speak an input to the natural language processing system 120. An example wakeword is "Alexa." As used herein, a "wakeword" may refer to a single word or more than one consecutive words in speech.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110a may "wake" and begin transmitting audio data 211, representing the audio 11, to the natural language processing system 120. The audio data 211 may include data corresponding to the wakeword, or the device 110a may remove the portion of the audio corresponding to the wakeword prior to sending the audio data 211 to the natural language processing system 120.

An orchestrator component 230 may receive the audio data 211. The orchestrator component 230 may include memory and logic that enables the orchestrator component 230 to transmit various pieces and forms of data to various components of the system 100, as well as perform other operations.

The orchestrator component 230 may send the audio data 211 to an ASR component 250. The ASR component 250 transcribes the audio data 211 into text data. The text data output by the ASR component 250 represents one or more than one (e.g., in the form of an n-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The text data output by the ASR component 250 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The device 110b may receive a text-based natural language user input. The device 110b may generate text data 213 representing the text-based natural language user input. The device 110a may send the text data 213 to the natural language processing system 120. The orchestrator component 230 may receive the text data 713.

The orchestrator component 230 may send text data (e.g., text data output by the ASR component 250 or the received text data 213) to an NLU component 260.

The NLU component 260 attempts to make a semantic interpretation of the phrase(s) or statement(s) represented in the received text data. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the natural language processing system 120, a skill 290, a skill system 125, etc.) to execute the intent. For example, if the text data corresponds to "play Adele music," the NLU component 260 may determine an intent that the natural language processing system 120 output music and may identify "Adele" as an artist. For further example, if the text data corresponds to "what is the weather," the NLU component 260 may determine an intent that the natural language processing system 120 output weather information associated with a geographic location of the device 110. In another example, if the text data corresponds to "turn off the lights," the NLU component 260 may determine an intent that the natural language processing system 120 turn off lights associated with the device(s) 110 or the user(s) 5. The NLU component 260 may output NLU data (which may include tagged text data, indicators of intent, indicators of entities, indicators of slots, indicators of skills, etc.).

As described above, the natural language processing system 120 may perform speech processing using two different components (e.g., the ASR component 250 and the NLU component 260). One skilled in the art will appreciate that the natural language processing system 120, in at least some examples, may implement a spoken language understanding (SLU) component that is configured to process the audio data 211 to generate NLU data.

In some examples, the SLU component may be equivalent to the ASR component 250 and the NLU component 260. For example, the SLU component may process the audio data 211 and generate NLU data. The NLU data may include intent data and/or slot data. While the SLU component may be equivalent to a combination of the ASR component 250 and the NLU component 260, the SLU component may process audio data 211 and directly generate the NLU data, without an intermediate step of generating text data (as does the ASR component 250). As such, the SLU component may take the audio data 211 representing natural language speech and attempt to make a semantic interpretation of the natural language speech. That is, the SLU component may determine a meaning associated with the natural language speech and then implement that meaning. For example, the SLU component may interpret the audio data 211 representing natural language speech from the user 5 in order to derive an intent or a desired action or operation from the user 5. In some examples, the SLU component outputs a most likely NLU hypothesis recognized in the audio data 211, or multiple NLU hypotheses in the form of a lattice or an N-best list with individual hypotheses corresponding to confidence scores or other scores (such as probability scores, etc.).

The natural language processing system 120 may include one or more skills 290. A "skill" may be software running on the natural language processing system 120 that is akin to a software application running on a traditional computing device. That is, a skill 290 may enable the natural language processing system 120 to execute specific functionality in order to provide data or produce some other requested output. The natural language processing system 120 may be configured with more than one skill 290. For example, a weather service skill may enable the natural language processing system 120 to provide weather information, a car service skill may enable the natural language processing system 120 to book a trip with respect to a taxi or ride sharing service, a restaurant skill may enable the natural language processing system 120 to order a pizza with respect to the restaurant's online ordering system, etc. A skill 290 may operate in conjunction between the natural language processing system 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

Additionally or alternatively to being implemented by the natural language processing system 120, a skill 290 may be implemented by a skill system 125. Such may enable a skill system 125 to execute specific functionality in order to provide data or perform some other action requested by a user.

Skills may be associated with different domains, such as smart home, music, video, flash briefing, shopping, and custom (e.g., skills not associated with any pre-configured domain).

The natural language processing system 120 may be configured with a single skill 290 dedicated to interacting with more than one skill system 125.

Unless expressly stated otherwise, reference herein to a "skill" may include a skill 290 operated by the natural language processing system 120 and/or skill operated by a skill system 125. Moreover, the functionality described herein as a skill may be referred to using many different terms, such as an action, bot, app, or the like.

The natural language processing system 120 may include a TTS component 280. The TTS component 280 may generate audio data (e.g., synthesized speech) from text data using one or more different methods. Text data input to the TTS component 280 may come from a skill 290, a skill system 125, the orchestrator component 230, or another component of the natural language processing system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The natural language processing system 120 may include a user recognition component 295 that recognizes one or more users associated with data input to the natural language processing system 120. The user recognition component 295 may take as input the audio data 211 and/or the text data 213. The user recognition component 295 may perform user recognition by comparing speech characteristics in the audio data 211 to stored speech characteristics of users. The user recognition component 295 may additionally or alternatively perform user recognition by comparing biometric data (e.g., fingerprint data, iris data, etc.), received by the natural language processing system 120 in correlation with a user input, to stored biometric data of users. The user recognition component 295 may additionally or alternatively perform user recognition by comparing image data (e.g., including a representation of at least a feature of a user), received by the natural language processing system 120 in correlation with a user input, with stored image data including representations of features of different users. The user recognition component 295 may perform other or additional user recognition processes, including those known in the art. For a particular user input, the user recognition component 295 may perform processing with respect to stored data of users associated with the device 110 that captured the natural language user input.

The user recognition component 295 determines whether a user input originated from a particular user. For example, the user recognition component 295 may generate a first value representing a likelihood that a user input originated from a first user, a second value representing a likelihood that the user input originated from a second user, etc. The user recognition component 295 may also determine an overall confidence regarding the accuracy of user recognition operations.

The user recognition component 295 may output a single user identifier corresponding to the most likely user that originated the natural language user input. Alternatively, the user recognition component 295 may output multiple user identifiers (e.g., in the form of an N-best list) with respective values representing likelihoods of respective users originating the natural language user input. The output of the user recognition component 295 may be used to inform NLU processing, processing performed by a skill 290, as well as processing performed by other components of the natural language processing system 120 and/or other systems.

In some implementations, however, 295 may be turned off, inactive, or otherwise not engaged to perform user recognition. In such cases, the natural language processing system may assign input audio data to a default account, or a user or group account associated with the device 110, or otherwise determine a user/group account to which to assign incoming data.

The natural language processing system 120 may include profile storage 270. The profile storage 270 may include a variety of information related to individual users, groups of users, devices, etc. that interact with the natural language processing system 120. A "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the natural language processing system 120 with permission to allow the skill to execute with respect to the user's inputs. If a user does not enable a skill, the natural language processing system 120 may not permit the skill to execute with respect to the user's inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The natural language processing system 120 may also include a profile determination component 275. The profile determination component 275 may be configured to access and process profile data stored in the profile storage 270. The profile determination component 275 may additionally or alternatively be configured to write profile data to the profile storage 270.

The natural language processing system 120 may also include a data type storage 285. The data type storage 285 can be, for example, a volatile or non-volatile computer memory. The data type storage 285 can store, for example, one or more data structures, such as the data structure 130, used to store associations between input identifiers and output identifiers. The natural language processing system 120 can store associations in the one or more data structures 130 in the data type storage 285 and retrieve them as necessary to execute deletion requests.

Figure 2B:
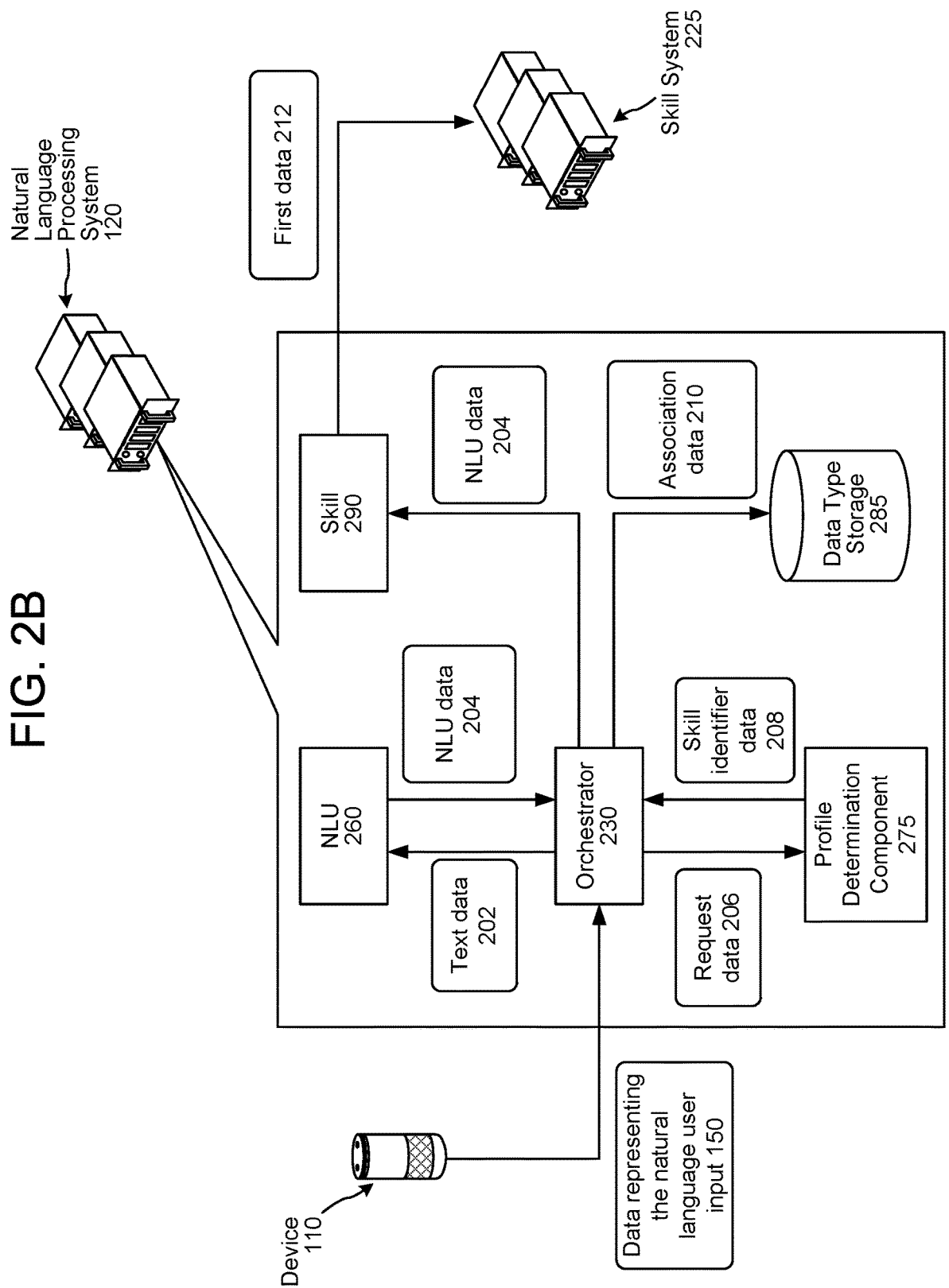
FIG. 2B is a conceptual diagram illustrating how a natural language processing system may process a natural language user input including a type of data, in accordance with embodiments of the present disclosure.

FIG. 2B illustrates how the natural language processing system 120 may process, at runtime, a natural language user input for future deletion using internal keys. A device 110 may receive a natural language user input. The natural language user input may be a spoken natural language user input or a text-based natural language user input. If the natural language user input is a spoken natural language user input, the device 110 may send, to the orchestrator component 230, audio data representing the spoken natural language user input. If the natural language user input is a text-based user input, the device 110 may send, to the orchestrator component 230, text data representing the text-based natural language user input.

If the orchestrator component 230 receives audio data representing a spoken natural language user input, the orchestrator component 230 may cause the ASR component 250 to generate text data representing the spoken natural language user input in the audio data. The orchestrator component 230 may send, to the NLU component 260, text data 202 (either received at step 202 or as generated by the ASR component 250) representing the natural language user input.

The NLU component 260 may perform NLU processing on the text data to generate NLU data. Part of this NLU processing may include entity resolution processing, whereby an entity, represented in the text data, is processed to corresponding to an entity known to the natural language processing system 120. In at least some examples, the natural language processing system 120 may include one or more entity resolution services, which may be implemented separately from the NLU component 260. In at least some examples, each entity resolution service may correspond to a different domain. In such examples, the NLU component 260 may determine a domain to which the natural language user input most likely corresponds, and may send the text data 202 (or a tagged and slotted representation thereof) to an entity resolution service corresponding to the domain. The entity resolution service may resolve one or more tagged entities represented in the text data 202 sent to the entity resolution service. Thereafter, the entity resolution service may send, to the NLU component 260, text data representing the resolved entities. The NLU component 260 may incorporate the received text data into NLU data 204 representing the natural language user input. The NLU component 260 may send the NLU data 204 to the orchestrator component 230.

The orchestrator component 230 may determine a profile identifier corresponding to the natural language user input. In at least some examples, the orchestrator component 230 may receive a user identifier(s) from the user recognition component 295, and may determine a profile identifier associated with the user identifier (or top scoring user identifier if more than one user identifier is received from the user recognition component 295). The orchestrator component 230 may send, to the profile determination component 275, request data 206 representing the profile identifier, the NLU data (or a portion thereof, such a portion representing an a domain to which the natural language user input corresponds), and an instruction to provide skill identifiers that are associated with the profile identifier and that correspond to the NLU data (or portion thereof).

The profile determination component 275 may communicate with the profile storage 270. The profile determination component 275 may determine profile data, in the profile storage 270, associated with the profile identifier. The profile determination component 275 may then determine, in the profile data, one or more skill identifiers corresponding to the NLU data (or a portion thereof). In at least some examples, the profile determination component 275 may determine one or more skill identifiers corresponding to a domain represented in the NLU data (or the portion thereof). The profile determination component 275 may send, to the orchestrator component 230, skill identifier data representing the one or more skill identifiers determined by the profile determination component 275.

In at least some examples, the request data 206 may include a portion representing sensitive data is to be sent to a skill. In such examples, the profile determination component 275 may determine a subset, of the determined one or more skill identifiers, associated with indicators representing the user has provided permission for the user's sensitive data to be sent to skills corresponding to the subset of skill identifiers. In such examples, only this subset of skill identifiers may be represented in the skill identifier data 208.

The orchestrator component 230 may select, from among the skill identifiers represented in the skill identifier data 208, a skill identifier corresponding to a skill 290 to be invoked with respect to the natural language user input. The orchestrator component 230 may send, to the skill 290 corresponding to the selected skill identifier, first data 212 representing at least a portion of the NLU data 204. The skill 290 may then perform processing based on the received at least a portion of the NLU data 204.

In at least some examples, the first data 212 may include metadata representing the at least a portion of the NLU data corresponds to a type of data (e.g., sensitive data). This metadata enables the skill 290 to maintain a record of the types of data it has received and stored.

In at least some examples, the orchestrator component 230 may select, from among the skill identifiers represented in the skill identifier data 208, a skill identifier corresponding to a skill system 225. When this occurs, the orchestrator component 230 may send the first data 212 to a skill 290 associated with the domain corresponding to the at least a portion of the NLU data 204 represented in the first data 212. In turn, the skill 290 may send the first data 212 to the skill system 225. In another example, the orchestrator component 230 may send the first data 212 to a skill 290 configured to communicate with various skill systems, which may correspond to different domains. In turn, the skill 290 may send the first data 212 to the skill system 225 corresponding to the skill identifier selected by the orchestrator component 230.

To facilitate the skill 290 sending the first data 212 to the appropriate skill system 225, the orchestrator component 230 may send, to the skill 290, the skill identifier selected by the orchestrator component 230. The skill 290 may then send the first data 212 to the skill system 225 corresponding to the received skill identifier.

The skill 290 or skill system 225 may store received data in storage associated with the skill 290 or skill system 225 (e.g., storage that is not controlled by the orchestrator component 230 or the system 120).

Sometime after the orchestrator causes NLU data to be sent to a skill 290, skill system 225, or other target system 140, a user corresponding to the data may want the data to be deleted. As a result, it may be beneficial for the system 220 to maintain a record of data in the form of associations between input identifiers and output identifiers, as previously discussed with reference to FIG. 1. Such record will enable the system 220 to ensure data is deleted from target systems such as a skill's or skill system's storage when a user requests such deletion. To this end, the orchestrator component 230 may cause association data 210 to be stored as one or more data structures 130 in a data type storage 285. The association data 210 may include input and output identifiers as described previously, and as further discussed below with reference to FIG. 3A and FIG. 3B. Example operations of the system 100 are illustrated by FIG. 4A though FIG. 4E and the corresponding description below.

FIG. 3A and FIG. 3B illustrate example data structures storing associations between known keys and internal keys, in accordance with embodiments of the present disclosure. FIG. 3A and FIG. 3B illustrate examples of how association data may be stored as data structures 130 in the data type storage 285. FIG. 3A and FIG. 3B show five example data structures in the form of tables 301, 302, 303, 304, 305, and 306. The table 301 is an example representation of a simple data structure storing associations between user identifiers and utterance identifiers. The user identifiers illustrated may be obtained by the system, for example, by determining a user profile associated with a device that received an utterance and using the user profile to determine the user identifier. In another example, the system may determine the user identifier of a user speaking an utterance through user identification/speaker identification techniques such as those described in reference to FIGS. 5-8 below, or other techniques. The table 301 shows utterance identifiers that are sequential and consecutive, but it is not required that the utterance identifiers either be assigned sequentially or consecutively by the system, or ordered sequentially or consecutively in the data structure. Should the natural language processing system 120 receive, for example, a request to delete all input audio data and text data associated with a user having the user identifier user_ID_0001, the system 120 can use the internal identifier user_ID_0001 to determine a set of one or more associated output identifiers, which in the example of the table 301 would be {utterance_ID_0001, utterance_ID_0002, utterance_ID_0003, utterance_ID_0006}. The system 120 can then use the set of output identifiers to generate a delete command that the system 120 can send to any target systems 140 that may have received relevant data. In some implementations, the table 301 can include different or additional associations; for example, additional rows or columns. The data structure is not limited to table form, and could be implemented as a relational or other type of database. The tables 302, 303, 304, 305, and 306 show examples of other possible data structure formats.

The table 302 is a representation of a data structure storing associations between user identifiers, device identifiers, and utterance identifiers. Should the natural language processing system 120 receive a request to delete all input audio data and text data associated with a device having the device identifier device_ID_0002, the system 120 can use the internal identifier device_ID_0002 to determine a set of one or more associated output identifiers, which in the example of the table 302 would be {utterance_ID_0002, utterance_ID_0003, utterance_ID_0005, utterance_ID_0006}. In some implementations, the system can also include the device identifier in the set of output identifiers: {utterance_ID_0002, utterance_ID_0003, utterance_ID_0005, utterance_ID_0006, device_ID_0002}. The system 120 can then use the set of output identifiers to generate a delete command that the system 120 can send to any target systems 140 that may have received relevant data.

The table 303 is a representation of a data structure storing associations between user identifiers, skill identifiers, and utterance identifiers. The system 120 can use the table 303 to execute, for example, a request to delete all data associated with a particular skill for a particular user. Should the natural language processing system 120 receive a request to delete all input audio data and text data associated with a user having the user identifier user_ID_0001 and a skill having the skill identifier skill_ID_0002, the system 120 can determine a set of one or more associated output identifiers, which in the example of the table 303 would be {utterance_ID_0002, utterance_ID_0006}. In some implementations, the system can also include the skill identifier in the set of output identifiers: {utterance_ID_0002, utterance_ID_0006, skill_ID_0002}. The system 120 can then use the set of output identifiers to generate a delete command that the system 120 can send to any target systems 140 that may have received relevant data.

In FIG. 3B, the table 304 is a representation of a data structure storing associations between user identifiers and utterance identifiers, and also including a user type field for when the system 120 determines that the speaker (or user) belongs to a particular category of user; for example, a child user, a child user under the age of 13, a child user under the age of 16, etc. In some implementations, the user type can be a 1/0 Boolean such as a child-directed flag indicating, for example, that the user is a minor under the age of 13, 16, 18, etc. In some implementations, the user type field could be replaced with an integer child age field. The natural language processing system 120 can use the user type associations to generate a delete command to delete, for example, child-directed data. Such associations could be useful, for example, in allowing the system 120 to execute commands to delete all child-generated data, even in absence of the system having user identifiers for each child that previously issued spoken commands or requests to the system.

The table 305 is a representation of a data structure having associations between user identifiers, device identifiers, skill identifiers, utterance identifiers, and user type. The system 120 can use the table 305 to determine sets of output identifiers from an input identifier or combination of input identifiers. In some implementations, the data structure[s] could include additional data fields; for example, account identifier, group identifier, timestamp information, information about whether the system 120 was able to execute the request or command successfully, etc. Such associations can provide for more narrow or specific generation of commands for surgical deletion of user data.

The table 306 is a representation of a data structure having associations between input user identifiers and output user identifiers. When the system 120 recognizing a user (or assigns a unique identifier to an unknown user), the system 120 can tag the data from the user with a user identifier. In some cases the user identifier used by the system 120 may be different from the user identifier provided to the target system 140. The system 120 can therefore store an association between the input user identifier and the output user identifier. In some implementations, the input user identifier can be obscured from the target system. When the system 120 wishes to execute a command to delete, for example, data related to a particular user, it can delete data in its own system based on the input user identifier, and send a delete command including the output user identifier to the target system 140. The system can create and assign other identifier aliases in a similar manner; for example, input utterance identifier and output utterance identifier, input device identifier and output device identifier, etc.

FIG. 4A through FIG. 4E illustrate example signal flow diagrams illustrating a manner in which data can be deleted using keys, in accordance with embodiments of the present disclosure.

FIG. 4A illustrates an example signal flow diagram for operations including receiving input audio data at a user device 110, determining input and output identifiers by a natural language processing system 120, and storing associations between the input and output identifiers in one or more data structures 130. The operations include receiving input audio data corresponding to an utterance at the user device 110 (401) and sending it to the system 120 (402). The system 120 assigns an utterance identifier to the utterance and determines a user identifier of a speaker of the input audio data (403). For example, the system 120 may analyze the audio data of the utterance to match the voice of the speaker to stored voice identification data, for example as discussed below in reference to FIGS. 5-8. Or the system may user other techniques to identify the speaker of the utterance. The system 120 sends (404) the utterance identifier and the user identifier to a data type storage where the association between the user identifier and the utterance identifier is stored (405) in a data structure. The system 120 sends (406) a request corresponding to the utterance to a target system 140, such as a skill system 225. The target system 140 can then fulfill (407) the request for the user or otherwise act on the request or store data related to the request by, for example, invoking the relevant skill.

In some implementations, the system 120 can determine and store an association between a device identifier and an utterance identifier. The system 120 determines (408) a device identifier corresponding to the user device 110 and sends (409) the device identifier and the utterance identifier to a data type storage where the association between the device identifier and the utterance identifier is stored (410) in the data structure 130. This association can be combined or otherwise linked with the association between the user identifier and the utterance identifier.

In some implementations, the system 120 can determine and store an association between a skill identifier and an utterance identifier. The system 120 performs (411) speech processing using the input audio data to determine a command represented by the input audio data. The system 120 determines a skill corresponding to the command, and a skill identifier corresponding to the skill. For example, the system may perform NLU processing to determine an intent corresponding to the input data and may determine a skill associated with the intent. The system sends (412) the skill identifier and the utterance identifier to a data type storage where the association between the skill identifier and the utterance identifier is stored (413) in the data structure. This association can be combined or otherwise linked with the association between the user identifier and the utterance identifier.

In some implementations, the system 120 can determine (414) that the speaker is a particular user type and include a user type in the association stored in the data structure 130. The system 120 can determine that the user type of the speaker by one or more of several methods. For example, to determine that the speaker is a child the system 120 can analyze characteristics of the voice (the input audio data), determine whether the audio receiving device 110 is a child device, or determine whether the spoken command relates to a child-directed skill. When the system 120 determines that a user type, such as a child-directed flag, should be applied to the utterance, the system can send (415) an association including the user type to the data type storage where the association is stored (416) in the data structure 130.

Figure 4B:
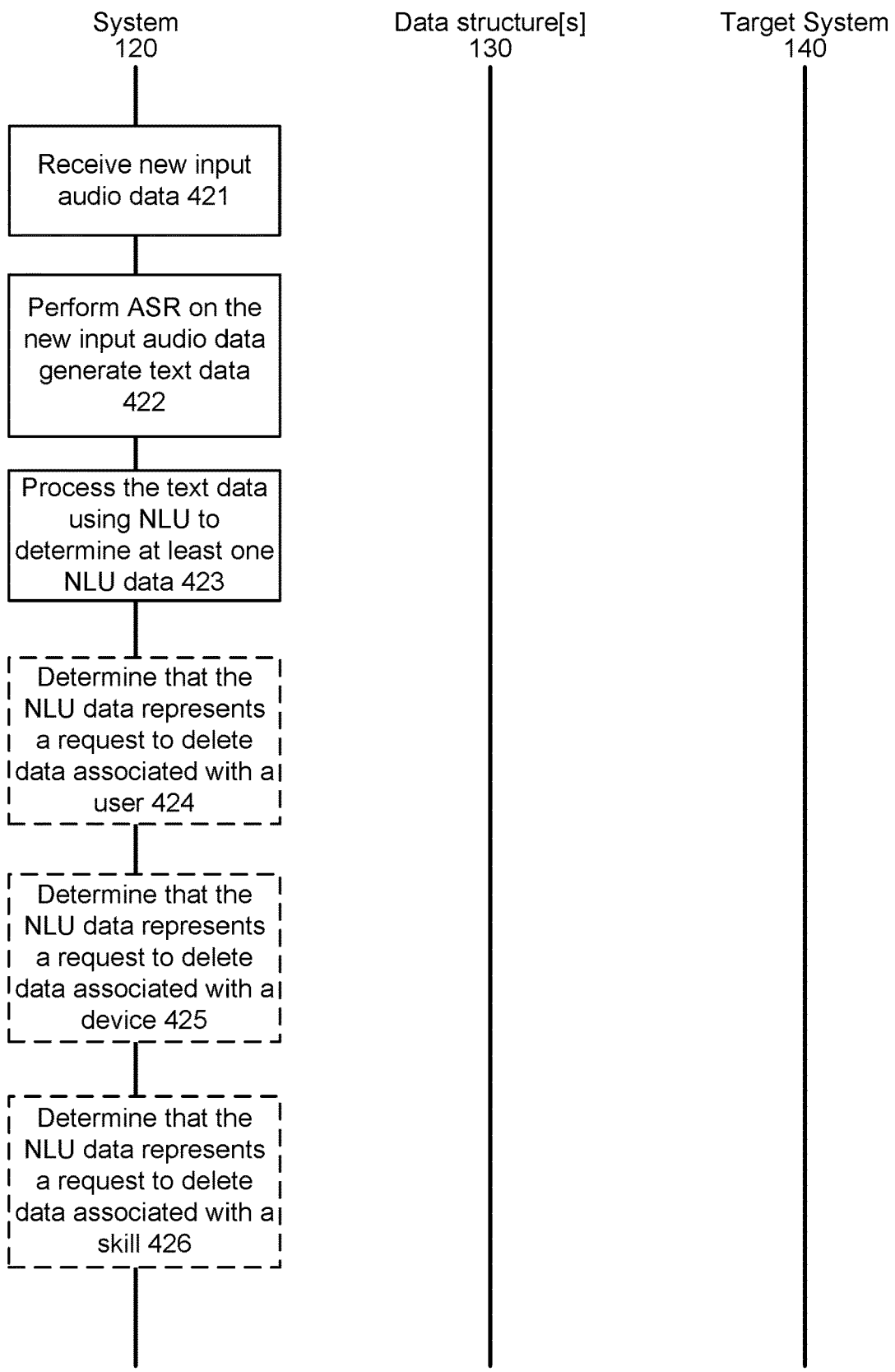

FIG. 4B illustrates an example signal flow diagram for operations including determining, by a natural language processing system 120, that a spoken command is a request to delete stored data. In an example operation of the system 120, the steps can include receiving (421) new input audio data. The input audio data can be received via the device 110 and sent to the system 120. The natural language processing system 120 can perform (422) ASR on the new input audio data to generate text data. The system 120 can process (423) the text data using NLU to determine NLU data, where the NLU data represents a hypothesis indicating a user intent to delete data.

In some implementations, the system 120 can determine additional information regarding the user intent. For example, the system 120 may determine (424) that the hypothesis represents a request to delete data associated with a user, determine (425) that the hypothesis represents a request to delete data associated with a device, or determine (426) that hypothesis represents a request to delete data associated with a skill. In other implementations, the system 120 can variously determine that the user wishes to delete only a subset of data for a particular user, device, or skill; for example, deleting data within a bounded timeframe. Once the system 120 determines that the user has input a command to delete user data, the system 120 can prompt the user to confirm the command, and then proceed with executing the delete request; for example, as described below with reference the example signal flow diagrams shown in FIG. 4C, FIG. 4D, and/or FIG. 4E.

The NLU data determined in step 423 may include, for example, intent data, slot data, entity data, score data, or the like. For example, for a spoken request to delete data the NLU data may include intent data corresponding to a <deletedata> intent. For example, a request to delete data corresponding to a particular user, slot data may correspond to <user123>. For example, a request to delete data corresponding to a particular skill for the user slot data may correspond to <user_ID_0002> and <skill_ID_0001>. For example, a request to delete data corresponding to a particular device, the slot data may correspond to <device_ID_0002>, etc.

The NLU operations (or other operations) may also process utterance data to identify the specific user (or users) that correspond to a delete request. For example, an utterance of "Alexa, delete my data" may be processed by the system 120 to determine that "my" corresponds to a particular user. Such determination may be made using various components, for example, those discussed below in reference to FIGS. 5-8. The system 120 may then associate the request with the user ID for that particular user, such as <user_ID_0002> for purposes of deleting data as described herein. In another example, an utterance of "Alexa, delete my kids' data" may be processed by the system 120 to determine that "my kids" corresponds to a group of child IDs corresponding to the same group profile as the speaker of the utterance. The system 120 may do so by identifying all users with the user type <child> associated with a household profile. The system 120 may then associate the request to delete with the children's IDs, such as <user_ID_0003> and <user_ID_0004> for purposes of deleting data as described herein. In another example, an utterance of "Alexa, delete my guests' data" may be processed by the system 120 to determine that "my guests" corresponds to a group of guest IDs corresponding to the same group profile as the speaker of the utterance. The system 120 may do so by identifying all users with the user type <guest> associated with a household profile. The system 120 may then associate the request to delete with the guests' IDs, such as <user_ID_0010> and <user_ID_0011> for purposes of deleting data as described herein.

Figure 4C:
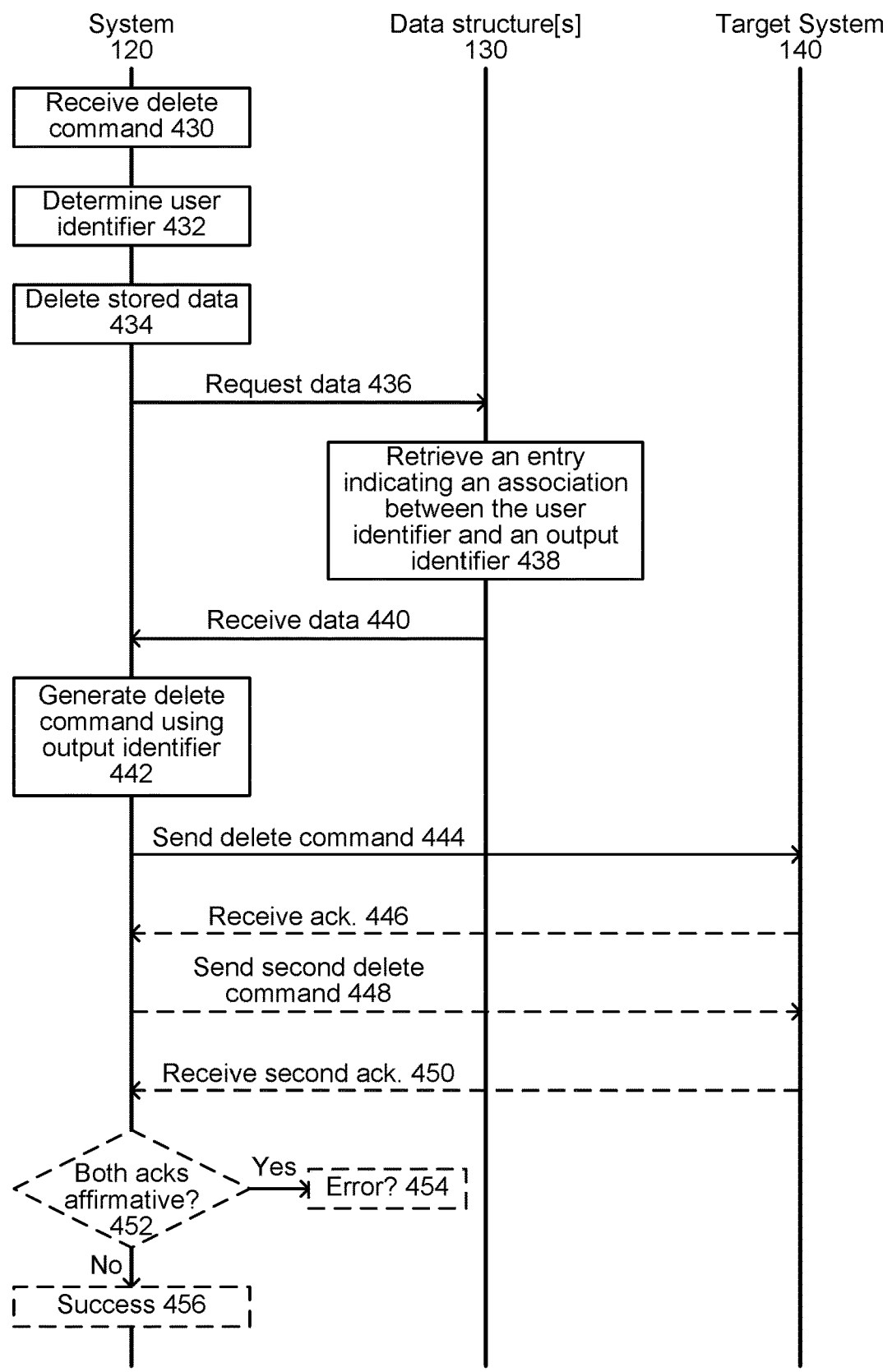

FIG. 4C illustrates an example signal flow diagram for operations including deleting, by a natural language processing system 120, stored data using output identifiers retrieved from a data structure 130. These operations can be used, for example, to delete data associated with a child-directed device, or to delete data associated with a device that a user wishes to deregister. The data to be deleted can include utterances received by the device as well as device history of aggregate data pertaining to the device. The operations include the system 120 receiving (430) a request to delete stored data associated with a user profile (for example in steps 421-426 discussed above in reference to FIG. 4B). The system determines (432) a user identifier for a user associated with the user profile. The system 120 deletes (434) stored data associated with a user identifier corresponding to the user profile. The system 120 uses the user identifier (436) to retrieve (438) data from the data structure 130 associations (440) between the user identifier and one or more output identifiers. The one or more output identifiers can include one or more utterance identifiers previously assigned to data provided by the user associated with the user identifier. The system 120 generates (442) a delete command using the one or more output identifiers and sends (444) the delete command, including the output identifiers, to one or more target systems 140. In some implementations, the system 120 can additionally delete profile data associated with the user identifier; that is, settings or other data other than input audio data and text data.

In some implementations, the system 120 receives (446) from the target system a command acknowledgment responsive to the command. The system 120 can maintain a record of such command acknowledgements for auditing and compliance purposes. In some such implementations, the system 120 can send (448) a second command having the same output identifiers as the first command. The system 120 can receive (450) a second command acknowledgement. The system 120 can compare (452) the two acknowledgements. If the acknowledgements differ—for example, the first acknowledgment indicates a successful deletion and the second acknowledgement indicates that no relevant data was found—the system 120 may determine that the target system 140 successfully executed the first delete command (456). However, if both acknowledgments are affirmative—that is, both acknowledgments indicate successful deletion of relevant data—the system 120 may determine that the target system has experienced an error (454).

In some implementations, the system 120 can remove from the data structure 130 entries that are no longer needed or relevant due to the deletion of the corresponding data. Following the retrieval of the associations from the data structure 130 or the sending of the delete command, the system 120 can delete the data representing the association between the user identifier and an utterance identifier corresponding to the first audio data from the data structure 130. This can prevent limitless growth of the data structure 130 and conserve memory and storage resources.

Figure 4D:
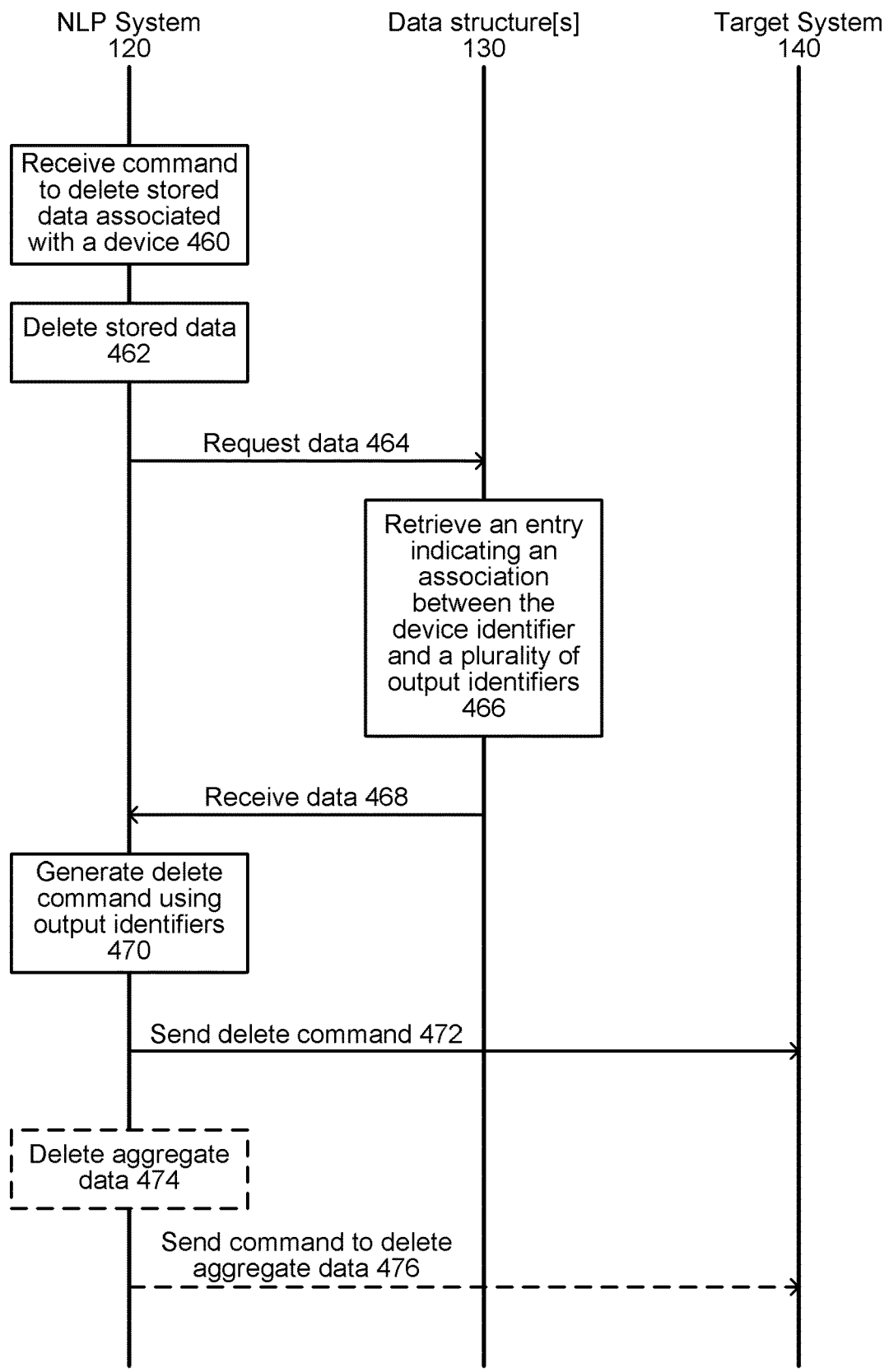

FIG. 4D illustrates an example signal flow diagram for operations including deleting, by a natural language processing system 120, stored data associated with a device. The operations include the system 120 receiving (460) a request to delete stored data associated with a device. The system determines a device identifier for the device and deletes (462) stored data associated with the device identifier. The system 120 uses the device identifier (464) to retrieve (466) data from the data structure 130 associations (468) between the device identifier and a plurality of output identifiers. The output identifiers can include the device identifier and one or more utterance identifiers previously assigned to data provided via the device associated with the device identifier. The system 120 generates (470) a delete command using the output identifiers and sends (472) the delete command, including the output identifiers, to one or more target systems 140.

In some implementations, the system 120 can additionally orchestrate deleting additional data associated with the device identifier such as device state data and aggregate data. For example, executing a request to delete data associated with a particular device may also include or imply a request to delete data aggregated from that device. Accordingly, the system 120 can delete (474) any aggregate data associated with the device identifier that it has stored, and send (476) a command to the target system 140 to delete any aggregate data associated with the device identifier.

Figure 4E:
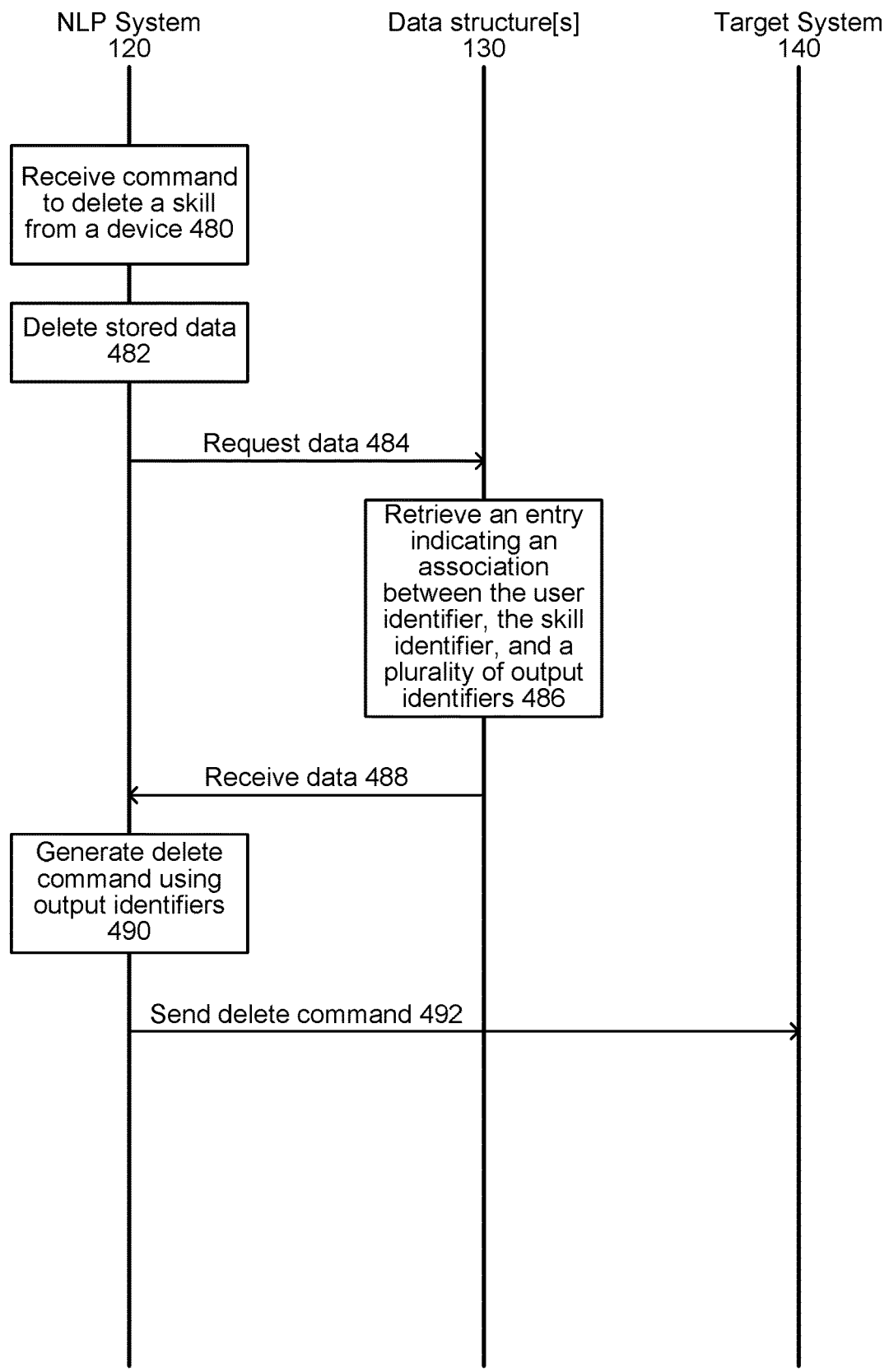

FIG. 4E illustrates an example signal flow diagram for operations including deleting, by a natural language processing system 120, stored data associated with use of a skill on a device. These operations can be invoked when, for example, a user removes a skill such as an app from a device. The operations include the system 120 receiving (480) a request to remove a skill from a device. The system determines a skill identifier for the skill, and the device identifier of the device, and deletes (482) stored data associated with the skill identifier and the device identifier. The system 120 uses the skill identifier and the device identifier (484) to retrieve (486) data from the data structure 130 associations (488) between the user identifier, the skill identifier, and a plurality of output identifiers. The output identifiers can include one or more utterance identifiers previously assigned to data associated with the skill identifier and the device identifier. The system 120 generates (490) a delete command using the output identifiers and sends (492) the delete command, including the output identifiers, to one or more target systems 140.

Figure 5:
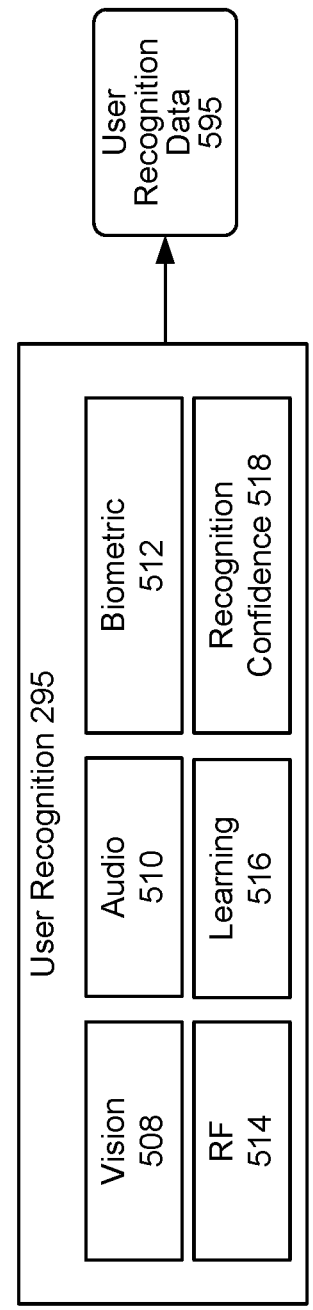
FIG. 5 is a schematic diagram of an illustrative architecture in which sensor data is combined to recognize one or more users, in accordance with embodiments of the present disclosure.

As described above, the system 120 may include a user recognition component 295. The user recognition component 295 may recognize one or more users using a variety of data. As illustrated in FIG. 5, the user recognition component 295 may include one or more subcomponents including a vision component 508, an audio component 510, a biometric component 512, a radio frequency (RF) component 514, a learning component 516, and a recognition confidence component 518. In some instances, the user recognition component 295 may monitor data and determinations from one or more subcomponents to recognize an identity of one or more users associated with data input to the system 120. The user recognition component 295 may output user recognition data 595, which may include a user identifier associated with a user the user recognition component 295 believes originated data input to the system 120. The user recognition component 295 may be used to inform processes performed by various components of the system 120 as described herein.

The vision component 508 may receive data from one or more sensors capable of providing images (e.g., cameras) or sensors indicating motion (e.g., motion sensors). The vision component 508 can perform facial recognition or image analysis to determine an identity of a user and to associate that identity with a user profile associated with the user. In some instances, when a user is facing a camera, the vision component 508 may perform facial recognition and identify the user with a high degree of confidence. In other instances, the vision component 508 may have a low degree of confidence of an identity of a user, and the user recognition component 295 may use determinations from additional components to determine an identity of a user. The vision component 508 can be used in conjunction with other components to determine an identity of a user. For example, the user recognition component 295 may use data from the vision component 508 with data from the audio component 510 to identify what user's face appears to be speaking at the same time audio is captured by a device 110 the user is facing for purposes of identifying a user who spoke an input to the system 120.

The overall system of the present disclosure may include biometric sensors that transmit data to the biometric component 512. For example, the biometric component 512 may receive data corresponding to fingerprints, iris or retina scans, thermal scans, weights of users, a size of a user, pressure (e.g., within floor sensors), etc., and may determine a biometric profile corresponding to a user. The biometric component 512 may distinguish between a user and sound from a television, for example. Thus, the biometric component 512 may incorporate biometric information into a confidence level for determining an identity of a user. Biometric information output by the biometric component 512 can be associated with specific user profile data such that the biometric information uniquely identifies a user profile of a user.

The RF component 514 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 514 the strength of the signal (e.g., as a received signal strength indication (RSSI)). The RF component 514 may use the RSSI to determine an identity of a user (with an associated confidence level). In some instances, the RF component 514 may determine that a received RF signal is associated with a mobile device that is associated with a particular user identifier.

In some instances, a device 110 may include some RF or other detection processing capabilities so that a user who speaks an input may scan, tap, or otherwise acknowledge the user's personal device (such as a phone) to the device 110. In this manner, the user may "register" with the NPL system 120 for purposes of the system 120 determining who spoke a particular input. Such a registration may occur prior to, during, or after speaking of an input.

The learning component 516 may track the behavior of various users as a factor in determining a confidence level of the identity of the user. By way of example, a user may adhere to a regular schedule such that the user is at a first location during the day (e.g., at work or at school). In this example, the learning component 516 would factor in past behavior and/or trends in determining the identity of the user that provided input to the system 120. Thus, the learning component 516 may use historical data and/or usage patterns over time to increase or decrease a confidence level of an identity of a user.

In at least some instances, the recognition confidence component 518 receives determinations from the various components 508, 510, 512, 514, and 516, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 595.

The audio component 510 may receive data from one or more sensors capable of providing an audio signal (e.g., one or more microphones) to facilitate recognition of a user. The audio component 510 may perform audio recognition on an audio signal to determine an identity of the user and associated user identifier. In some instances, aspects of the system 120 may be configured at a computing device (e.g., a local server). Thus, in some instances, the audio component 510 operating on a computing device may analyze all sound to facilitate recognition of a user. In some instances, the audio component 510 may perform voice recognition to determine an identity of a user.

The audio component 510 may also perform user identification based on audio data 211 input into the system 120 for speech processing. The audio component 510 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 510 may perform user recognition by comparing speech characteristics represented in the audio data 211 to stored speech characteristics of users (e.g., stored voice profiles associated with the device 110 that captured the spoken user input).

Figure 6:
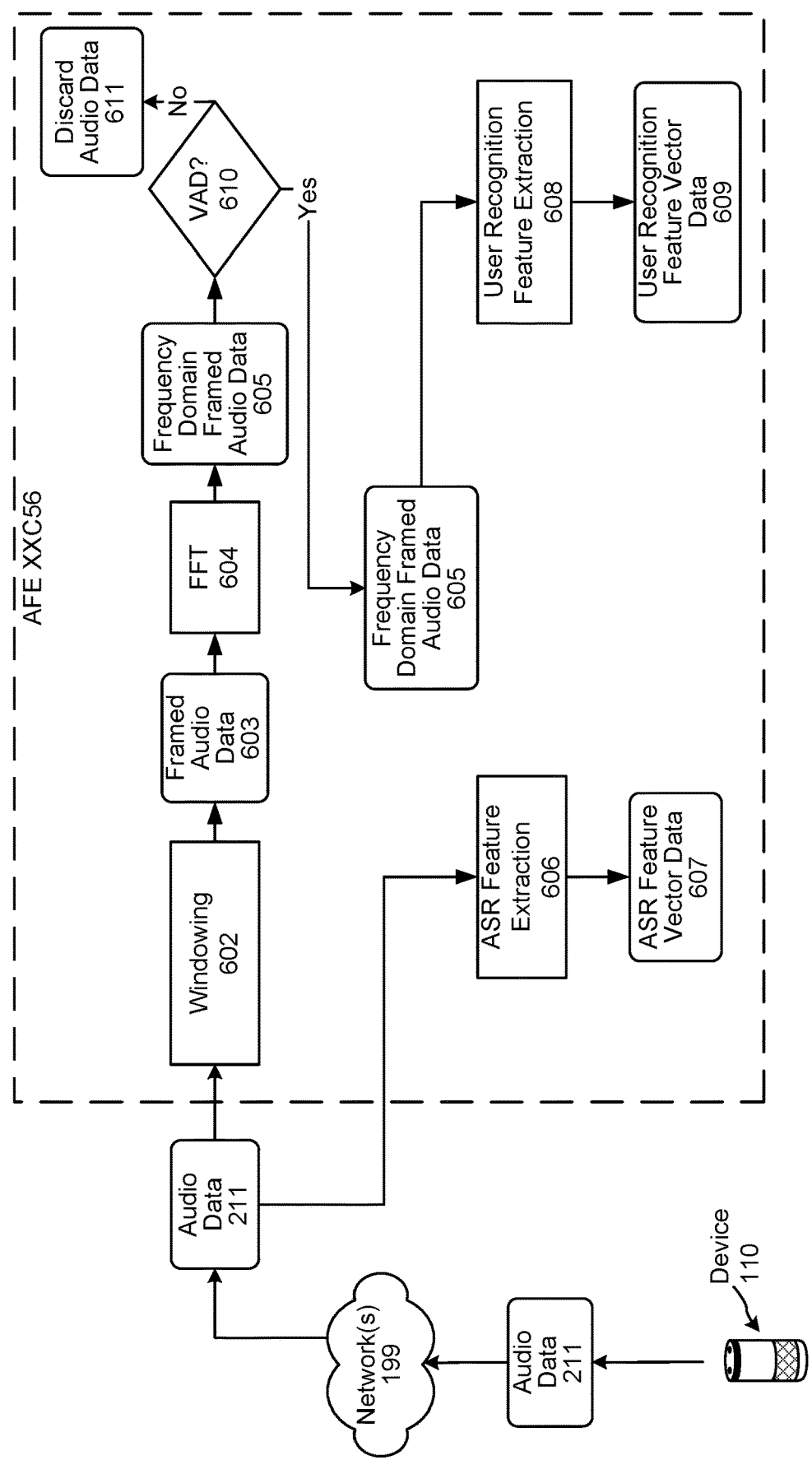
FIG. 6 is a flow diagram illustrating processing performed to prepare audio data for ASR processing and user recognition processing, in accordance with embodiments of the present disclosure.

FIG. 6 illustrates processing performed to prepare audio data for ASR processing and user recognition processing. As described, the device 110 sends audio data 211 through a network(s) 199 to the system 120 for processing. The system 120 may include an acoustic front end (AFE) 656 (or other component(s)) that performs various functions on the audio data 211 to prepare the audio data 211 for further downstream processing, such as ASR processing and/or user recognition processing. For example, the AFE 656 may perform (602) windowing functions on the audio data 211 to create framed audio data 603 (e.g., waveforms). The size of each frame may depend upon implementation. In an example, each frame may include twenty-five (25) milliseconds (m/s) of audio data, with an overlap of the next frame of 10 ms of data, thus resulting in sliding window processing of audio data. Performing a windowing function may include multiplying a time record by a finite-length window with an amplitude that varies smoothly and gradually toward zero at its edges. By performing such, the endpoints of the waveforms of respective frames of audio data meet, resulting in a continuous waveform without sharp transitions. The AFE 656 may then perform (604) a fast Fourier transform (FFT) that converts the waveforms in each frame of the framed audio data 603 from its original domain (e.g., time) to a representation in a frequency domain (thereby creating frequency domain framed audio data 605). Audio processing techniques other than or in addition to FFT may be used to transform audio data (e.g., waveforms) into data that can be processed as needed.

The system 120 (through the AFE 656 or using another component) then detects (610) whether voice activity (i.e., speech) is present in the post-FFT waveforms (i.e., frequency domain framed audio data 605). The VAD detector 610 (or other components) may also be configured in a different order, for example the VAD detector 610 may operate on audio data 211 rather than on frequency domain framed audio data 605, may operate on ASR features, etc. Various different configurations of components are possible. If there is no speech in the audio data, the system 120 discards (611) the frequency domain framed audio data 605 (i.e., removes the audio data from the processing stream). If, instead, the system 120 detects speech in the frequency domain framed audio data 605, the system 120 performs user recognition feature extraction (608) on the frequency domain framed audio data 405. User recognition feature extraction (608) may include performing frame level feature extraction and/or utterance level feature extraction. The frame level feature extraction may determine which frame of a universal background model (UBM) the frame corresponds to. The UBM may be a Gaussian mixture model, a deep neural network, etc. The utterance level feature extraction may analyze aligned speech frames to derive feature vectors of fixed length (i.e., the user recognition feature vector data 609). The feature extraction may continue until voice activity is no longer detected in the audio data, at which point the system 120 may determine that an endpoint of the speech has been reached.

ASR feature extraction (606) may be performed on all the audio data 211 received from the device 110. Alternatively (not illustrated), ASR feature extraction (606) may only be performed on audio data including speech (as indicated by the VAD 610). ASR feature extraction (606) and/or user recognition feature extraction (608) involve determining values (i.e., features) representing qualities of the frequency domain framed audio data 605, along with quantitating those features into values (i.e., feature vectors or audio feature vectors). ASR feature extraction (606) may determine ASR feature vector data 607 useful for ASR processing, and user recognition feature extraction (608) may determine user recognition feature vector data 609 (sometimes called an i-vector) useful for user recognition. The ASR feature vector data 607 and the user recognition feature vector data 609 may be the same feature vectors, different feature vectors, or may include some overlapping feature vectors. A number of approaches may be used to extract feature vectors from the frequency domain framed audio data 605, such as MFCCs, PLP techniques, neural network feature vector techniques, linear discriminant analysis, semi-tied covariance matrices, or other approaches known to those skilled in the art.

ASR feature vector data 607 may include a different audio feature vector for each audio frame. Thus, for one 25 ms long audio frame, the ASR feature extraction component 606 may output a single ASR feature vector. The ASR feature vectors 607 output by the ASR feature extraction component 606 may be output to the ASR component 250.

Depending on system configuration, the user recognition feature extraction component 608 may output multiple user recognition feature vectors, for example one such vector for each audio frame. Alternatively, the user recognition feature extraction component 608 may continue to input the frequency domain framed audio data 605 while the utterance is ongoing (e.g., before the endpoint of the speech is reached in the audio data 605). While the audio data 605 for the utterance is input, the user recognition feature extraction component 608 may accumulate or otherwise combine the audio data 605 as it comes in. That is, for a certain frame's worth of audio data 605 that comes in, the user recognition feature extraction component 608 may combine that frame's worth of data to the previous data received for the particular utterance. The particular method of accumulation may vary, including using an arithmetic component, a recurrent neural network (RNN), trained model, or other component capable of combining audio data. Further, the form of combination performed by the user recognition feature extraction component 608 may depend on what audio qualities are determined to be important for ultimate user recognition. Thus, the user recognition feature extraction component 608 may be trained to isolate and process data that is most useful for user recognition. The output of the user recognition feature extraction component 608 may thus include user recognition feature vector data 609 that includes values for features useful for user recognition. The resulting user recognition feature vector data 609 may then be used for user recognition.

Figure 7:
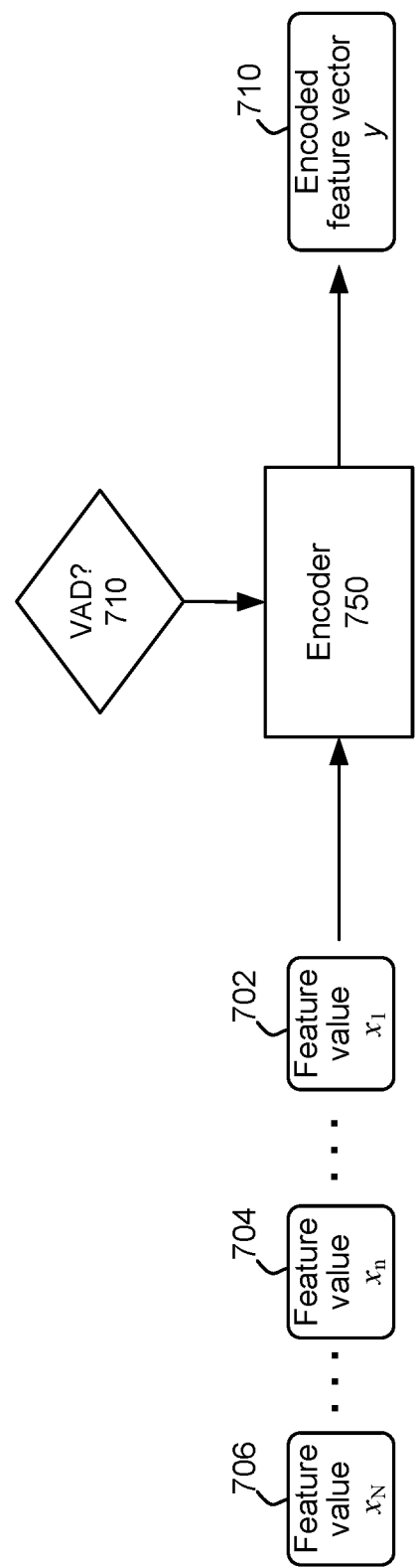
FIG. 7 is a diagram of a vector encoder, in accordance with embodiments of the present disclosure.

The user recognition feature vector data 609 may include multiple vectors, each corresponding to different portions of the utterance. Alternatively, the user recognition feature vector data 609 may be a single vector representing audio qualities of the utterance. Referring to FIG. 7, the single vector may be created using an encoder 750 that can create a fixed-size vector to represent certain characteristics of the audio data as described below. In mathematical notation, given a sequence of feature data values $x_1, \ldots x_n, \ldots x_N$, with $x_n$ being a D-dimensional vector, an encoder $E(x_1, \ldots x_N) = y$ projects the feature sequence to y, with y being a F-dimensional vector. F is a fixed length of the vector and is configurable depending on use of the encoded vector and other system configurations. As shown in FIG. 7, feature values 702, 704, and 706 (which may include feature vectors of audio data 211, frequency domain framed audio data 605, or the like) may be input into an encoder 750 that will output an encoded feature vector 710 that represents the input feature values. The VAD 610 may be an input into the encoder 750 such that the encoder 750 may only operate when feature values input therein correspond to speech. The individual feature values (e.g., 702, 704, and 706) may correspond to specific audio frames. Regardless of how many feature values are input, any particular encoder 750 will be configured to output vectors of the same size, thus ensuring a continuity of output encoded vector size from any particular encoder 750 (though different encoders may output vectors of different fixed sizes) and enabling comparison of different feature vectors y. The value y may be called an embedding of the sequence $x_1, \ldots x_N$. The length of $x_n$ and y are fixed and known a-priori, but the length of N of feature sequence $x_1, \ldots x_N$ is not necessarily known a-priori. The encoder 750 may be implemented as a neural network (NN), recurrent neural network (RNN), GMM, or other model. One particular example is a long short-term memory (LSTM) RNN. There are a variety of ways for the encoder 750 to consume the encoder input, including but not limited to:

linear, one direction (forward or backward),
  bi-linear, essentially the concatenation of a forward and a backward embedding, or
  tree, based on parse-tree of the sequence.

In addition, an attention model can be used, which is another RNN or deep neural network (DNN) that learns to "attract" attention to certain parts of the input. The attention model can be used in combination with the above methods of consuming the input.

FIG. 7 illustrates operation of the encoder 750. The input feature value sequence, starting with feature value $x_1$ 702, continuing through feature value $x_n$ 704, and concluding with feature value $x_N$ 706 is input into the encoder 750. The encoder 750 may process the input feature values as noted above. The encoder 750 outputs the encoded feature vector y 710, which is a fixed length feature vector of length F. Thus, the user recognition feature extraction component 708 may include an encoder 750 that receives audio feature values for a particular utterance as input, and outputs a fixed length encoded feature vector y 710, which may be the user recognition feature vector data 609. Thus, in certain system configurations, no matter how long the utterance is, or how many acoustic frames worth of feature values are input into the encoder 750, the output feature vector 710/609 will be of the same length, thus allowing for more ease of performing user recognition by the user recognition component 295. To allow for robust system operation, a final vector 710/609 may include many dimensions (e.g., several hundred), thus providing many datapoints for downstream consideration.

To determine the user recognition feature vector data 609, the system may (for example using the VAD detector 610) determine that voice activity is detected in input audio. This may indicate the beginning of the utterance, thus resulting in the system determining that the input utterance starts at a first point in audio data. Audio processing (for example by windowing 602, FFT 604, ASR feature extraction 606, user recognition feature extraction 608, ASR processing, or the like) may continue on the utterance audio data starting at the first point and continuing until the VAD detector 610 determines that voice activity is no longer detected at a second point in audio data. Thus, the system may determine that the input utterance ends at the second point. Thus, the first point may be considered the beginpoint of the utterance and the second point may be considered the endpoint of the utterance. The VAD detector 610, or other component, may signal the user recognition feature extraction component 608 when the beginpoint and/or endpoint is detected so that the user recognition feature extraction component 608 may begin processing audio data starting at the beginpoint and ending at the endpoint. Further, audio frames during the utterance that do not include speech may be filtered out by the VAD detector 610 and thus not considered by the ASR feature extraction component 606 and/or user recognition feature extraction component 608. The resulting accumulated/processed speech audio data for the utterance (from beginpoint to endpoint) may then be represented in a single feature vector for the user recognition feature vector data 609, which may then be used for user recognition.

Figure 8:
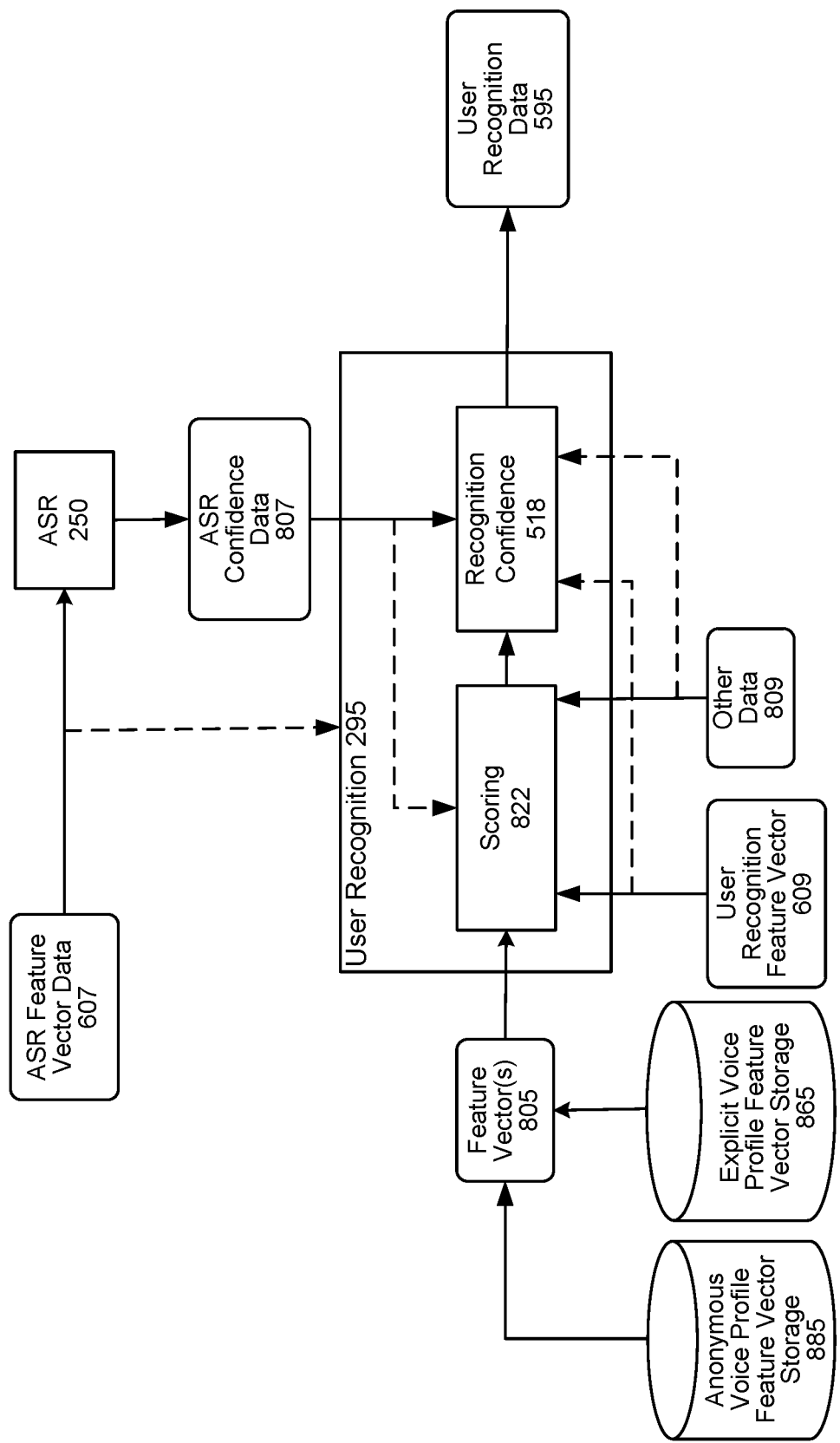
FIG. 8 is a system flow diagram illustrating user recognition processing, in accordance with embodiments of the present disclosure.

FIG. 8 illustrates user recognition as performed by the user recognition component 295. The ASR component 250 performs ASR on the ASR feature vector data 607 as described above. ASR confidence data 807 is passed to the user recognition component 295.

The user recognition component 295 performs user recognition using various data including the user recognition feature vector data 609, feature vectors 805 representing explicit and/or anonymous voice profiles, the ASR confidence data 807, and other data 809. The user recognition component 295 may then output user recognition confidence data 595, which reflects a certain confidence that the user input was spoken by one or more particular users. The user recognition confidence data 595 may include one or more user identifiers, one or more user profile identifiers, one or more explicit voice profile identifiers, and/or one or more anonymous voice profile identifiers. Each identifier in the user recognition confidence data 595 may be associated with a respective confidence value, representing a likelihood that the user input corresponds to the identifier. A confidence value may be a numeric or binned value.

A system may be configured to identify a user based on the user explicitly enrolling in the system's user recognition functionality. For example, a user may initiate an enrollment process in which the user speaks utterances requested by the system, such as repeating a wakeword a number of times, reading a series of short phrases, or repeating a series of words as requested by the system. The system may generate audio data from the speech and generate a voice profile representing the user's speech in the audio data. The system may associate the voice profile with a user identifier of a known user. A known user is a user that has voluntarily provided the system with various additional personally-identifiable information (e.g., a name, user name, email address, phone number, etc.). A voice profile associated with a known user identifier may be referred to herein as an explicit voice profile.

A user may provide a system with permission to generate voice profiles for one or more users that interact with a device or group of devices (e.g., devices associated with a particular household). After receiving such permission and when a user input is received by the device(s), the system may determine speech characteristics representing the user input. The system may cluster user inputs associated with similar speech characteristics. For example, a single user may speak various inputs to a device(s) after the system receives permission to generate voice profiles for one or more users that interact with the device(s). Even though the user's inputs may be substantively different (e.g., may request the system perform different actions), the different inputs of the user may have similar or identical speech characteristics (e.g., pitch, tone, etc.). Thus, when the system generates a voice profile by clustering the user inputs having the same or similar speech characteristics, the system is effectively generating a voice profile specific to a user even though the system does not know which user provided the inputs. This type of voice profile may be referred to as an anonymous voice profile.

The feature vector(s) 805 input to the user recognition component 295 may correspond to one or more anonymous voice profiles (stored in anonymous voice profile feature vector storage 885) and/or one or more explicit voice profiles (stored in explicit voice profile feature vector storage 865). The user recognition component 295 may compare the feature vector(s) 805 against the user recognition feature vector 609, representing the present user input, to determine whether the user recognition feature vector 609 corresponds to one or more of the feature vectors 805 of the anonymous and/or explicit voice profiles.

Each feature vector 805 may be the same size as the user recognition feature vector 609. Thus, for example, if the user recognition feature vector 609 is of size F (for example encoded by the encoder 750), a feature vector 805 may also be of size F.

To perform user recognition, the user recognition component 295 may determine the device 110 from which the audio data 211 originated. For example, the audio data 211 may be associated with metadata including a device identifier representing the device 110. Either the device 110 or the system 120 may generate the metadata. The system 120 may determine a group profile identifier associated with the device identifier, may determine user profile identifiers associated with the group profile identifier, and may include the group profile identifier and/or the user profile identifiers in the metadata. The system 120 may associate the metadata with the user recognition feature vector 609 produced from the audio data 211. The user recognition component 295 may send query the anonymous voice profile feature vector storage 885 and/or the explicit voice profile feature vector storage 865 for feature vectors 805 associated with the device identifier, the group profile identifier, and/or the user profile identifiers represented in the metadata. This limits the universe of possible feature vectors 805 the user recognition component 295 considers at runtime and thus decreases the amount of time to perform user recognition by decreasing the amount of feature vectors 805 needed to be processed. Alternatively, the user recognition component 295 may access all (or some other subset of) feature vectors 805 available to the user recognition component 295. However, accessing all feature vectors 805 will likely increase the amount of time needed to perform user recognition based on the magnitude of feature vectors to be processed.

The user recognition component may attempt to identify the user that spoke the speech represented in the audio data 211 by comparing the user recognition feature vector 609 to the received feature vector(s) 805. The user recognition component 295 may include a scoring component 822 that determines respective scores indicating whether the user input (represented by the user recognition feature vector 609) was spoken by one or more particular users (represented by the feature vector(s) 805). The user recognition component 295 may also include a confidence component 518 that determines an overall accuracy of user recognition operations (such as those of the scoring component 822) and/or an individual confidence value with respect to each user potentially identified by the scoring component 822. The output from the scoring component 822 may include a different confidence value for each received feature vector 805. For example, the output may include a first confidence value for a first feature vector (representing a first anonymous or explicit voice profile), a second confidence value for a second feature vector (representing a second anonymous or explicit voice profile), etc. Although illustrated as two separate components, the scoring component 822 and confidence component 518 may be combined into a single component or may be separated into more than two components.

The scoring component 822 and confidence component 518 may implement one or more trained machine learning models (such neural networks, classifiers, etc.) as known in the art. For example, the scoring component 822 may use probabilistic linear discriminant analysis (PLDA) techniques. PLDA scoring determines how likely it is that the user recognition feature vector 609 corresponds to a particular feature vector 805. The PLDA scoring may generate a confidence value for each feature vector 805 considered and may output a list of confidence values associated with respective user profile identifiers, anonymous voice profile identifiers, and/or explicit voice profile identifiers. The scoring component 822 may also use other techniques, such as GMMs, generative Bayesian models, or the like, to determine confidence values.

The confidence component 518 may input various data including information about the ASR confidence 807, speech length (e.g., number of frames or time of the user input), audio condition/quality data (such as signal-to-interference data or other metric data), fingerprint data, image data, or other factors to consider how confident the user recognition component 295 is with regard to the confidence values linking users to the user input. The confidence component 518 may also consider the confidence values and associated identifiers output by the scoring component 822. Thus, the confidence component 518 may determine that a lower ASR confidence 807, or poor audio quality, or other factors, may result in a lower confidence of the user recognition component 295. Whereas a higher ASR confidence 807, or better audio quality, or other factors, may result in a higher confidence of the user recognition component 295. Precise determination of the confidence may depend on configuration and training of the confidence component 518 and the models implemented thereby. The confidence component 518 may operate using a number of different machine learning models/techniques such as GMM, neural networks, etc. For example, the confidence component 518 may be a classifier configured to map a score output by the scoring component 822 to a confidence value.

The user recognition component 295 may output user recognition confidence data 595 specific to a single user profile identifier, anonymous voice profile identifier, or explicit voice profile identifier (or one or more user profile identifiers, one or more anonymous voice profile identifiers, and/or one or more explicit voice profile identifiers in the form of an N-best list). For example, the user recognition component 295 may output user recognition confidence data 595 with respect to each received feature vector 805. The user recognition confidence data 595 may include numeric confidence values (e.g., 0.0-1.0, 0-1000, or whatever scale the system is configured to operate). Thus, the user recognition confidence data 595 may output an N-best list of potential users with numeric confidence values (e.g., user profile identifier 123-0.2, anonymous voice profile identifier 234-0.8). Alternatively or additionally, the user recognition confidence data 595 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." Thus, the user recognition component 295 may output an N-best list of potential users with binned confidence value (e.g., user profile identifier 123-low, anonymous voice profile identifier 234-high). Combined binned and numeric confidence value outputs are also possible. Rather than a list of identifiers and their respective confidence values, the user recognition confidence data 595 may only include information related to the top scoring identifier as determined by the user recognition component 295. The user recognition component 295 may also output an overall confidence value that the individual confidence values are correct, where the overall confidence value indicates how confident the user recognition component 295 is in the output results. The overall confidence value may be determined by the confidence component 518.

The confidence component 518 may determine differences between individual confidence values when determining the user recognition confidence data 595. For example, if a difference between a first confidence value and a second confidence value is large (and, optionally) the first confidence value is above a threshold confidence value), then the user recognition component 295 is able to recognize a first user (associated with the feature vector 805 associated with the first confidence value) as the user that spoke the user input with a much higher confidence than if the difference between the confidence values were smaller.

The user recognition component 295 may perform thresholding to avoid incorrect user recognition results being output. For example, the user recognition component 295 may compare a confidence value output by the confidence component 518 to a threshold confidence value. If the confidence value does not satisfy (e.g., does not meet or exceed) the threshold confidence, the user recognition component 295 may not output user recognition confidence data 595, or may only include in that data 595 an indication that a user speaking the user input could not be recognized. Further, the user recognition component 295 may not output user recognition confidence data 595 until enough user recognition feature vector data 609 is accumulated and processed to verify a user above a threshold confidence. Thus, the user recognition component 295 may wait until a sufficient threshold quantity of audio data of the user input has been processed before outputting user recognition data 595. The quantity of received audio data may also be considered by the confidence component 518.

The user recognition component 295 may be defaulted to output binned (e.g., low, medium, high) user recognition confidence values. However, such may be problematic in certain situations. For example, if the user recognition component 295 computes a single binned confidence value for multiple feature vectors 805, the system may not be able to effectively determine which user originated the user input. In this situation, the user recognition component 295 may be configured to override its default setting and output numeric confidence values. This enables the system to determine a user associated with the highest numeric confidence value originated the user input.

The user recognition component may use other data 809 to inform user recognition processing. Thus, a trained model or other component of the user recognition component 295 may be trained to take other data 809 as an input feature when performing user recognition. The other data 809 may include a wide variety of data types depending on system configuration and may be made available from other sensors, devices, or storage. The other data 809 may include a time of day at which the audio data 211 was generated by the device 110 or received from the device 110, a day of a week in which the audio data 211 was generated by the device 110 or received from the device 110, etc.

The other data 809 may include image data and/or video data. For example, facial recognition may be performed on image data and/or video data received from the device 110 from which the audio data 211 was received (or another device). Facial recognition may be performed by the user recognition component 295, or another component of the system 120. The output of facial recognition processing may be used by the user recognition component 295. That is, facial recognition output data may be used in conjunction with the comparison of the user recognition feature vector 609 and one or more feature vectors 805 to perform more accurate user recognition.

The other data 809 may include location data of the device 110. The location data may be specific to a building within which the device 110 is located. For example, if the device 110 is located in user A's bedroom, such location may increase a user recognition confidence value associated with user A and/or decrease a user recognition confidence value associated with user B.

The other data 809 may include data indicating a type of the device 110. Different types of devices may include, for example, a smart watch, a smart phone, a tablet computer, and a vehicle. The type of the device 110 may be indicated in a profile associated with the device 110. For example, if the device 110 from which the audio data 211 was received is a smart watch or vehicle belonging to a user A, the fact that the device 110 belongs to user A may increase a user recognition confidence value associated with user A and/or decrease a user recognition confidence value associated with user B.

The other data 809 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the audio data 211 is generated by the vehicle. As such, if the vehicle is located at a coordinate corresponding to a work location/building of user A, such may increase a user recognition confidence value associated with user A and/or decrease user recognition confidence values of all other users indicated in a group profile associated with the vehicle. Global coordinates and associated locations (e.g., work, home, etc.) may be indicated in a profile associated with the device 110. The global coordinates and associated locations may be associated with one or more respective users.

The other data 809 may include additional data representing activity of a particular user that may be useful in performing user recognition. For example, if a user has recently entered a code to disable a home security alarm, and the audio data 211 was received from a device 110 represented in a group profile associated with the home, signals from the home security alarm about the disabling user, time of disabling, etc. may be reflected in the other data 809 and considered by the user recognition component 295. If a mobile device (such as a smart phone, Tile, dongle, or other device) known to be associated with a particular user is detected proximate to (for example physically close to, connected to the same WiFi network as, or otherwise nearby) the device 110, this may be reflected in the other data 809 and considered by the user recognition component 295.

Depending on system configuration, the other data 809 may be configured to be included in the user recognition feature vector data 609 (for example using the encoder 750) so that all the data relating to the user input to be processed by the scoring component 822 may be included in a single feature vector. Alternatively, the other data 809 may be reflected in one or more different data structures to be processed by the scoring component 822.

Various machine learning techniques may be used to train and operate models to perform various steps described above, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognition patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The user recognition component 295 may use one or more different types of user recognition processing (e.g., as described with respect to FIG. 5) depending on the data available to the user recognition component 295 and/or a recognition condition (e.g., threshold recognition confidence level) that needs to be satisfied. In some examples, simply performing one type of user recognition processing may be sufficient. In other examples, two or more different types of user recognition processing may be necessary to recognition the user to a degree satisfying the recognition condition.

Figure 9:
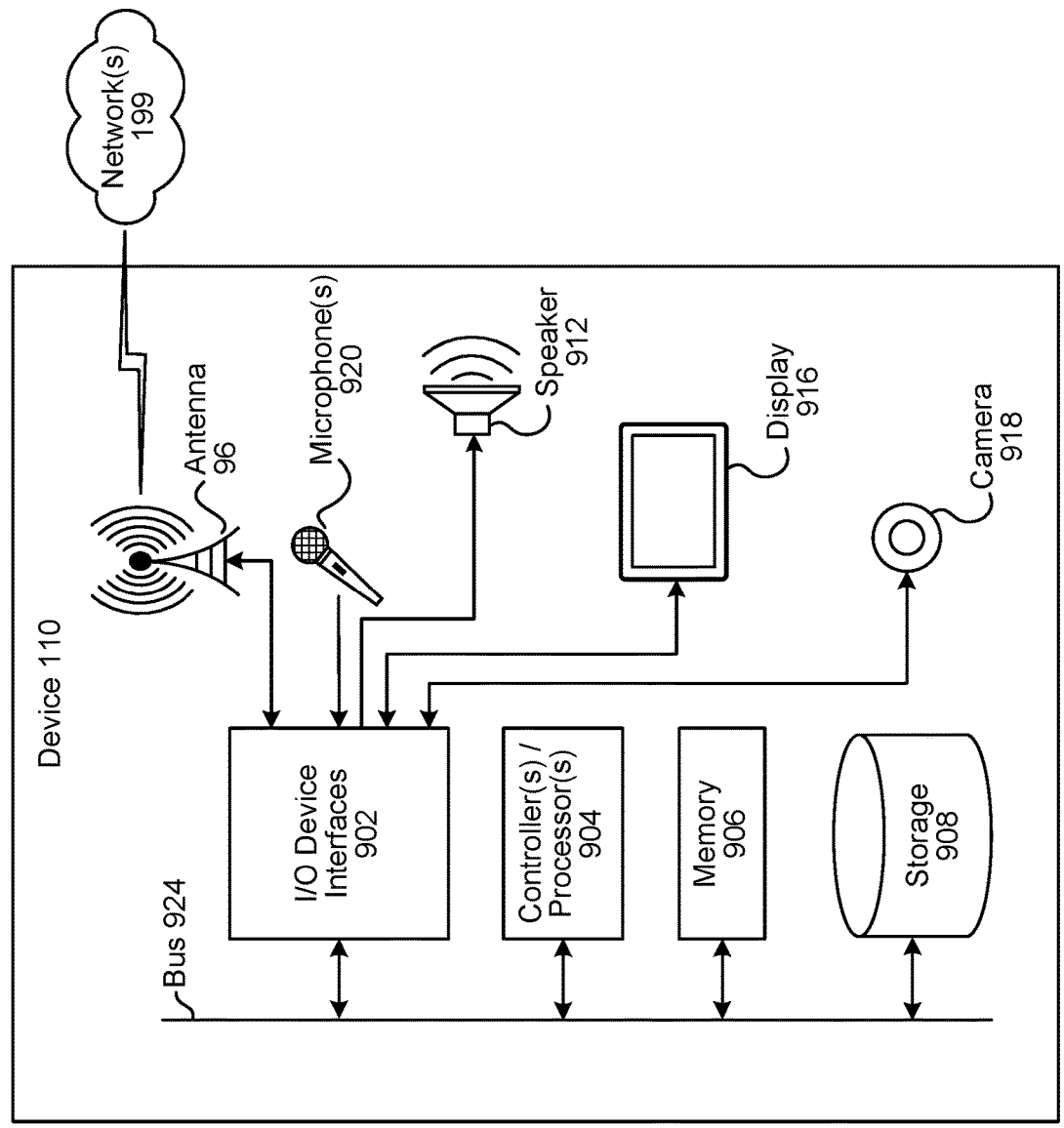
FIG. 9 is a block diagram conceptually illustrating example components of a device, in accordance with embodiments of the present disclosure.
Figure 10:
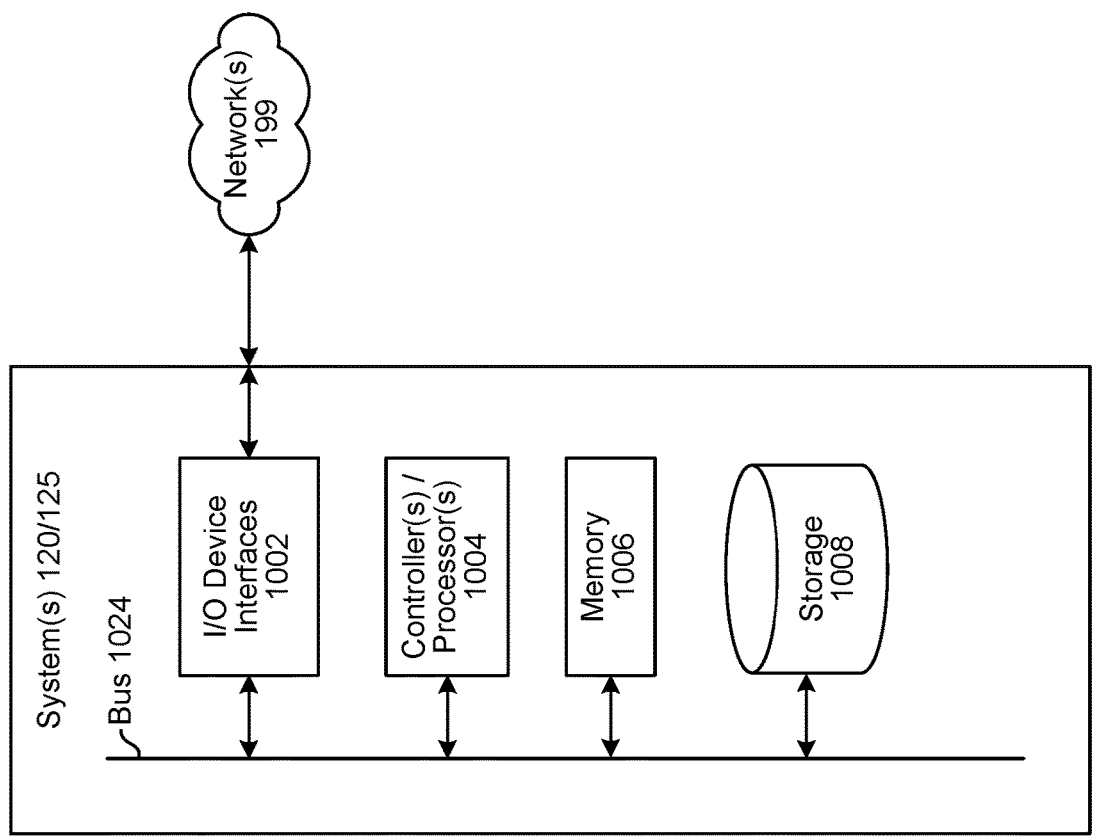
FIG. 10 is a block diagram conceptually illustrating example components of a system, in accordance with embodiments of the present disclosure.

FIG. 9 is a block diagram conceptually illustrating a device 110 that may be used with the system. FIG. 10 is a block diagram conceptually illustrating example components of a remote device, such as the natural language processing system 120, which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/125) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (902/1002).

Computer instructions for operating each device (110/120/125) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/125) includes input/output device interfaces (902/1002). A variety of components may be connected through the input/output device interfaces (902/1002), as will be discussed further below. Additionally, each device (110/120/125) may include an address/data bus (924/1024) for conveying data among components of the respective device. Each component within a device (110/120/125) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 95, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device(s) 110, the natural language processing system 120, or a skill system 125 may include their own dedicated processors, memory, and/or storage. Alternatively, one or more of the components of the device(s) 110, the natural language processing system 120, or a skill system 125 may utilize the I/O interfaces (902/1002), processor(s) (904/1004), memory (906/1006), and/or storage (908/1008) of the device(s) 110, natural language processing system 120, or the skill system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language processing system 120, and a skill system 125, as described herein, are illustrative, and may be located as a stand-alone device or may be included, in whole or in part, as a component of a larger device or system.

Figure 11:
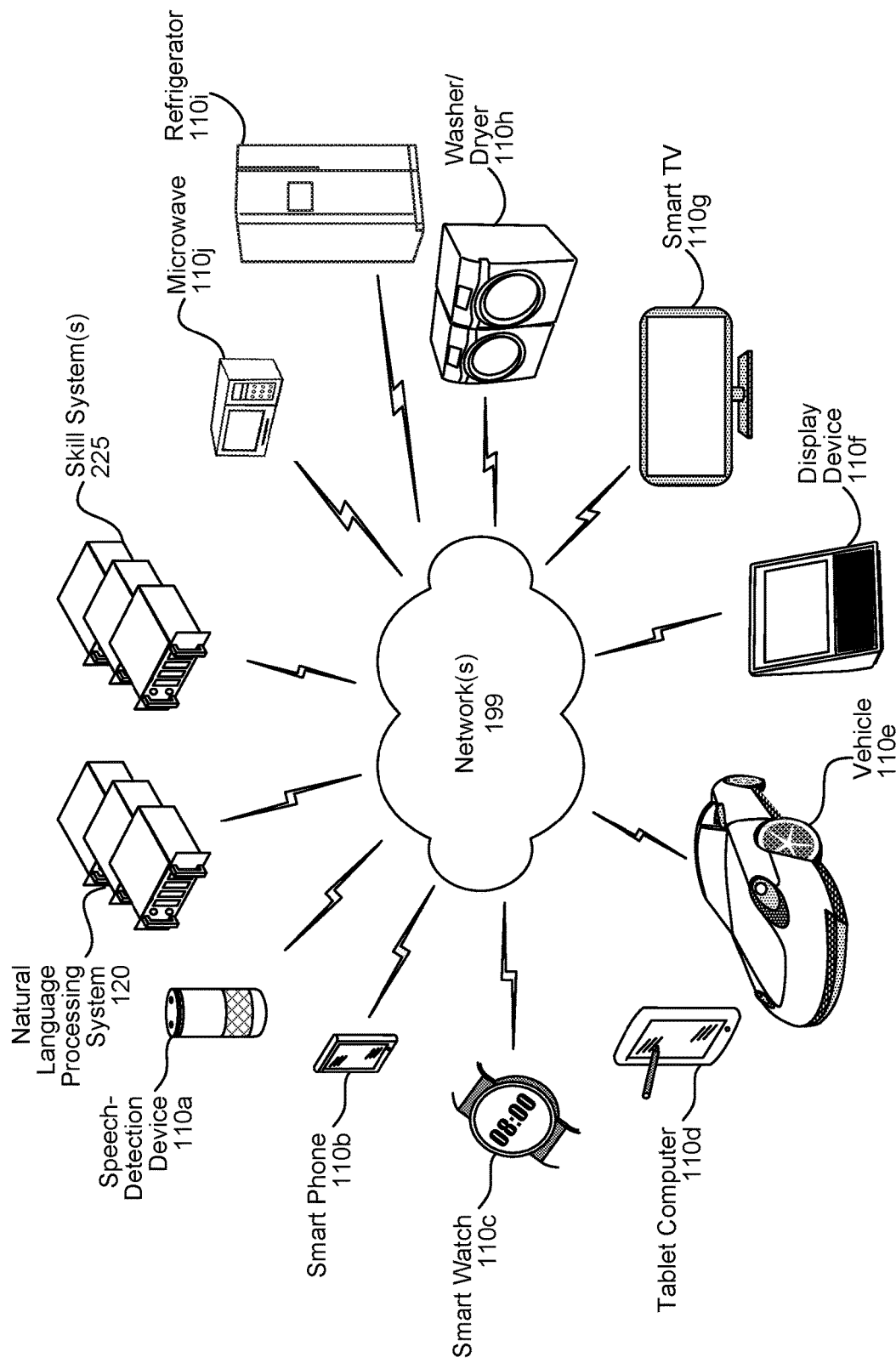
FIG. 11 illustrates an example of a computer network for use with the overall system, in accordance with embodiments of the present disclosure.

As illustrated in FIG. 11, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the natural language processing system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the natural language processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving first input audio data corresponding to a first utterance;
processing the first input audio data to determine a user identifier of a speaker of the first utterance;
storing, by a first system in at least one data structure, first data representing an association between the user identifier and an utterance identifier corresponding to the first input audio data;
sending, by the first system to a second system, the first input audio data associated with the utterance identifier;
receiving second input audio data corresponding to a second utterance;
performing automatic speech recognition (ASR) processing on the second input audio data to generate text data;
performing natural language understanding (NLU) processing on the text data to determine a first NLU data;
determining that the first NLU data represents a user intent to request deletion of data associated with the user identifier;
deleting, by the first system, first stored data associated with the user identifier;
determining, using the at least one data structure, an association between the user identifier and a first output identifier, the first output identifier corresponding to the utterance identifier; and
sending, to the second system, a command to delete second stored data associated with the first output identifier.

2. The method of claim 1, wherein the method further comprises:
receiving third input audio data corresponding to a third utterance;
performing ASR processing on the third input audio data to generate second text data;
performing NLU processing on the second text data to determine a second NLU data;
determining that the second NLU data represents a user intent to delete data associated with a device;
determining a device identifier associated with the device;
deleting, by the first system, third stored data associated with the device identifier;
determining, using the at least one data structure, an association between the device identifier and second output identifiers, the second output identifiers including the device identifier and at least the utterance identifier; and
sending, by the first system to the second system, a second command to delete fourth stored data associated with the second output identifiers.

3. The method of claim 1, further comprising:
receiving a request to delete stored data associated with a requested skill;
determining a skill identifier corresponding to the received request;
determining a device identifier corresponding to a device of the first system that received the first input audio data;
deleting, by the first system, third stored data associated with both the device identifier and the skill identifier;
determining, using the at least one data structure, an association between both the user identifier and the skill identifier, and a second output identifier, the second output identifier including at least the utterance identifier; and
sending, by the first system to the second system, a second command to delete fourth stored data associated with the second output identifier.

4. The method of claim 1, further comprising:
determining that the speaker is of a first user type; and
including second data representing the first user type in the first data representing the association between the user identifier and the utterance identifier, wherein the first output identifier includes an indicator corresponding to the second data.

5. A computer-implemented method comprising:
receiving first input audio data corresponding to an utterance;
determining, using the first input audio data, a user identifier of a speaker of the utterance;
storing, by a first system in at least one data structure, first data representing an association between the user identifier and an utterance identifier corresponding to the first input audio data;
receiving a request to delete stored data associated with a user profile;
determining that the user profile corresponds to the user identifier; and
deleting first stored data associated with the user identifier.

6. The method of claim 5, further comprising:
receiving second input audio data corresponding to a second utterance;
determining a device identifier corresponding to a device that received the second input audio data;
storing, in the at least one data structure, an association between the device identifier and a second utterance identifier corresponding to the second input audio data;
receiving a second request to delete stored data associated with the device;
deleting second stored data associated with the device identifier;
determining, using the at least one data structure, an association between the device identifier and output identifiers, the output identifiers including the device identifier and at least the second utterance identifier; and
sending, to a second system, a second command to delete third stored data associated with second output identifiers.

7. The method of claim 5, further comprising:
receiving second audio data corresponding to a second utterance;
performing speech processing using second input audio data to determine a command represented by the second input audio data;
determining a skill corresponding to the command;
determining a skill identifier corresponding to the skill;
determining a device identifier corresponding to a device that received the second input audio data;
storing, by the first system in the at least one data structure, second data representing an association between the skill identifier, the device identifier, and a second utterance identifier corresponding to the second audio data;
receiving a second request to delete data associated with the skill;
deleting, by the first system, second stored data associated with the device identifier and the skill identifier;
determining, using the at least one data structure, an association between the skill identifier and a second output identifier, the second output identifier including at least the second utterance identifier; and
sending, by the first system to a second system, a second command to delete third stored data associated with the second output identifier.

8. The method of claim 5, further comprising:
determining a first device identifier corresponding to a device of the first system that received the first input audio data;
assigning a second device identifier to the device;
storing, in the at least one data structure, second data representing an association between the first device identifier and the second device identifier;
receiving a second request to delete stored data associated with the device;
deleting second stored data associated with the first device identifier;
determining, using the at least one data structure, an association between the first device identifier and the second device identifier; and
sending, to a second system, a second command to delete third stored data associated with the second device identifier.

9. The method of claim 5, wherein the request to delete stored data corresponds to a spoken command and the method further comprises:
receiving second input audio data corresponding to the spoken command;
performing automatic speech recognition processing on the second input audio data to generate text data;
performing natural language understanding (NLU) processing on the text data to determine NLU data; and
determining, based on the NLU data, an intent to request deletion of data associated with the user profile.

10. The method of claim 5, further comprising:
determining, using the at least one data structure, an association between the user identifier and a first output identifier, the first output identifier including the utterance identifier; and
sending, by the first system to a second system, a command to delete second stored data associated with the first output identifier.

11. The method of claim 10, further comprising:
receiving, from the second system, a first command acknowledgment responsive to the command;
sending, to the second system, a second command to delete the second stored data associated with the first output identifier;
receiving, from the second system, a second command acknowledgment responsive to the second command;
determining based on the second command acknowledgement differing from the first command acknowledgement, that a first command was successfully executed by the second system; and
storing second data associating the user identifier with an indication that the first command was successfully executed by the second system.

12. The method of claim 10, further comprising:
after sending the command:
deleting, from the one or more data structures, the first data representing the association between the user identifier and an utterance identifier corresponding to the first input audio data.

13. A first system, comprising:
at least one processor; and
at least one memory comprising instructions that, when executed by the at least one processor, cause the first system to:
receive first input audio data corresponding to an utterance;
determine, using the first input audio data, a user identifier of a speaker of the utterance;
store, in at least one data structure, first data representing an association between the user identifier and an utterance identifier corresponding to the first input audio data;
receive a request to delete stored data associated with a user profile;
determine that the user profile corresponds to the user identifier and
delete first stored data associated with the user identifier.

14. The first system of claim 13, wherein the at least one memory further comprises instructions that, when executed by the at least one processor, further cause the first system to:
receive second input audio data corresponding to a second utterance;
determine a device identifier corresponding to a device that received the second input audio data;
store, in the at least one data structure, an association between the device identifier and a second utterance identifier corresponding to the second input audio data;
receive a second request to delete stored data associated with the device;
delete second stored data associated with the device identifier;
determine, using the at least one data structure, an association between the device identifier and output identifiers, the output identifiers including the device identifier and at least the second utterance identifier; and
send, to a second system, a second command to delete third stored data associated with the second output identifiers.

15. The first system of claim 13, wherein the at least one memory further comprises instructions that, when executed by the at least one processor, further cause the first system to:
receive second audio data corresponding to a second utterance;
perform speech processing using the second input audio data to determine a command represented by the second input audio data;
determine a skill corresponding to the command;
determine a skill identifier corresponding to the skill;
determine a device identifier corresponding to a device that received the first input audio data;
store, by the first system in the at least one data structure, second data representing an association between the skill identifier, the device identifier, and a second utterance identifier corresponding to the second input audio data;
receive a second request to delete data associated with the skill;

delete, by the first system, second stored data associated with the device identifier and the skill identifier;

determine, using the at least one data structure, an association between the skill identifier and a second output identifier, the second output identifier including at least the second utterance identifier; and send, by the first system to a second system, a second command to delete third stored data associated with the second output identifier.

16. The first system of claim 13, wherein the at least one memory further comprises instructions that, when executed by the at least one processor, further cause the first system to:

determine a first device identifier corresponding to a device of the first system that received the first input audio data;

assign a second device identifier to the device;

store, in the at least one data structure, second data representing an association between the first device identifier and the second device identifier;

receive a second request to delete stored data associated with the device;

delete second stored data associated with the first device identifier;

determine, using the at least one data structure, an association between the first device identifier and the second device identifier; and send, to a second system, a second command to delete third stored data associated with the second device identifier.

17. The first system of claim 13, wherein the request to delete stored data corresponds to a spoken command and the at least one memory further comprises instructions that, when executed by the at least one processor, further cause the first system to:

receive second input audio data corresponding to the spoken command;

perform automatic speech recognition processing on the second input audio data to generate text data;

perform natural language understanding (NLU) processing on the text data to determine NLU data; and determine, based on the NLU data, an intent to request deletion of data associated with the user profile.

18. The first system of claim 13, wherein the at least one memory further comprises instructions that, when executed by the at least one processor, further cause the first system to:

determine, using the at least one data structure, an association between the user identifier and a first output identifier, the first output identifier including the utterance identifier; and send, by the first system to a second system, a command to delete second stored data associated with the first output identifier.

19. The first system of claim 18, wherein the at least one memory further comprises instructions that, when executed by the at least one processor, further cause the first system to:

receive, from the second system, a first command acknowledgment responsive to the command;

send, to the second system, a second command to delete the second stored data associated with the first output identifier;

receive, from the second system, a second command acknowledgment responsive to the second command;

determine based on the second command acknowledgement differing from the first command acknowledgement, that the first command was successfully executed by the second system; and store second data associating the user identifier with an indication that the first command was successfully executed by the second system.

20. The first system of claim 13, wherein the at least one memory further comprises instructions that, when executed by the at least one processor, further cause the first system to:

after sending the command:
delete, from one or more data structures, the first data representing the association between the user identifier and an utterance identifier corresponding to the first input audio data.

* * * * *